US012720454B2

(12) United States Patent
Hu et al.

(10) Patent No.: US 12,720,454 B2
(45) Date of Patent: Aug. 25, 2026

(54) METHOD FOR RESUMING UPLINK SYNCHRONIZATION, AND TERMINAL DEVICE AND STORAGE MEDIUM

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN); Zuomin Wu, Dongguan (CN); Xinlei Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 255 days.

(21) Appl. No.: 18/754,957

(22) Filed: Jun. 26, 2024

(65) Prior Publication Data

US 2024/0349214 A1 Oct. 17, 2024

Related U.S. Application Data

(63) Continuation of application No. PCT/CN2022/070777, filed on Jan. 7, 2022.

(51) Int. Cl.
*H04W 56/00* (2009.01)
*H04W 8/22* (2009.01)
(Continued)

(52) U.S. Cl.
CPC ......... *H04W 56/0015* (2013.01); *H04W 8/22* (2013.01); *H04W 56/0045* (2013.01); *H04W 76/19* (2018.02); *H04W 84/06* (2013.01)

(58) Field of Classification Search
CPC ......... H04W 56/0015; H04W 56/0045; H04W 8/22; H04W 76/19; H04W 84/06
See application file for complete search history.

(56) References Cited

U.S. PATENT DOCUMENTS

2022/0239417 A1* 7/2022 Cheng .................. H04L 1/1835
2022/0322477 A1* 10/2022 Sengupta ............. H04W 76/18
(Continued)

FOREIGN PATENT DOCUMENTS

CN 110446254 11/2019
CN 116848804 A * 10/2023 ........... H04B 7/1851
(Continued)

OTHER PUBLICATIONS

WIPO, International Search Report for PCT/CN2022/070777, Oct. 8, 2022.

(Continued)

*Primary Examiner* — Kenny S Lin
(74) *Attorney, Agent, or Firm* — Hodgson Russ LLP

(57) ABSTRACT

Provides is a method for resuming uplink synchronization. The method includes: reacquiring, by a terminal device, non-terrestrial network (NTN) system information in a case that an NTN ephemeris validity timer expires and the terminal device has a first terminal device capability, wherein the first terminal device capability indicates a capability of the terminal device for reading the NTN system information in a connected state, the NTN system information comprises ephemeris information of a serving satellite and/or a common timing advance (TA), and the terminal device is in the connected state.

20 Claims, 9 Drawing Sheets

(51) Int. Cl.
*H04W 76/19* (2018.01)
*H04W 84/06* (2009.01)

(56) References Cited

U.S. PATENT DOCUMENTS

| | | | | |
|---|---|---|---|---|
| 2022/0330191 | A1* | 10/2022 | Shin | G01S 19/258 |
| 2023/0098798 | A1* | 3/2023 | Cheng | H04W 76/30 370/503 |
| 2023/0344508 | A1* | 10/2023 | Tseng | H04W 56/0045 |
| 2024/0292351 | A1* | 8/2024 | Frederiksen | H04B 7/1851 |
| 2024/0340074 | A1* | 10/2024 | Yan | H04W 56/0005 |
| 2025/0056384 | A1* | 2/2025 | Tao | H04W 48/10 |
| 2025/0193819 | A1* | 6/2025 | Zhu | H04B 7/18541 |

FOREIGN PATENT DOCUMENTS

| | | | | |
|---|---|---|---|---|
| EP | 4099768 | A1 * | 12/2022 | H04L 43/0864 |
| EP | 4311320 | A1 * | 1/2024 | H04W 56/0045 |
| GB | 2609623 | A * | 2/2023 | H04W 36/06 |
| WO | 2021189183 | | 9/2021 | |

OTHER PUBLICATIONS

NEC, "Discussion on UL time synchronization for NR NTN," 3GPP TSG RAN WG1 #107-e, R1-2111178, Nov. 2021.
NTT Docomo, Inc., "Discussion on UL time and frequency synchronization enhancements for NTN," 3GPP TSG RAN WG1 #107-e, R1-2112105, Nov. 2021.
MCC Support, "Draft Report of 3GPP TSG RAN WG1 #107-e v0.1.0 (Online meeting, Nov. 11-19, 2021)," 3GPP TSG RAN WG1 Meeting #107bis-e, R1-220xxxx, Jan. 2022.

* cited by examiner f

First BWP

First BWP

UE initiates a random access procedure on the first BWP

Initial BWP

UE reads NTN system information at time T1, and an epoch time corresponding to the NTN system information is T2

NTN ephemeris validity timer expires

T1

T2

UE starts the ephemeris validity timer t

UE pauses an inactivity timer

UE resumes the inactivity timer

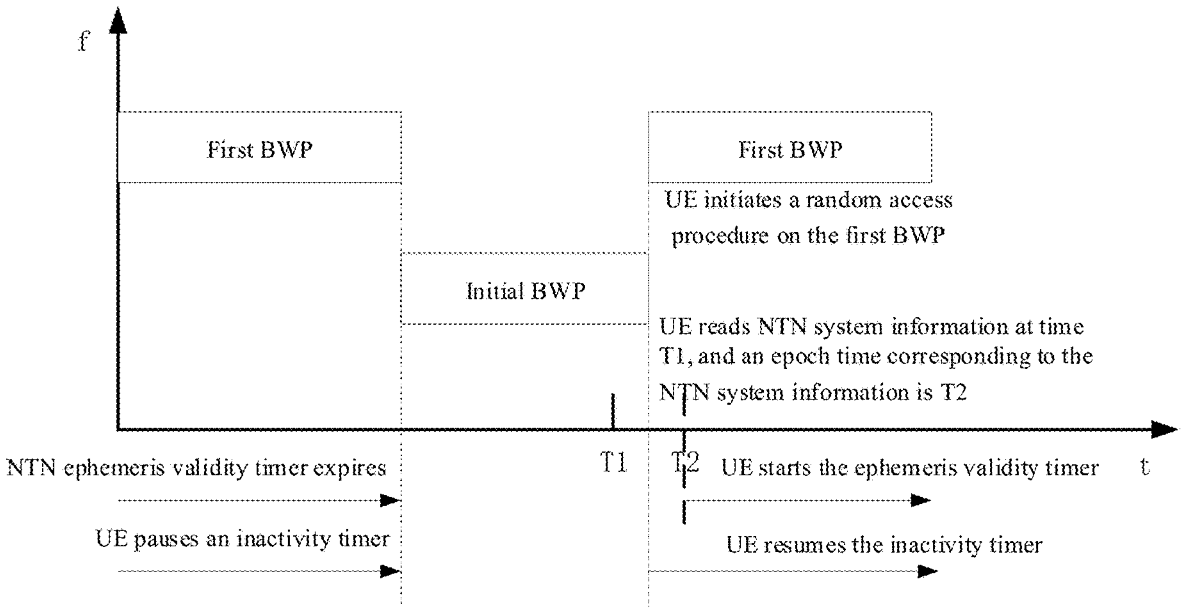

FIG. 6

Terminal device

Network device

701, Reporting second indication information to the network device

702, Upon expiration of an NTN ephemeris validity timer, reacquiring, by the terminal device, NTN system information in the case that the terminal device has a first terminal device capability

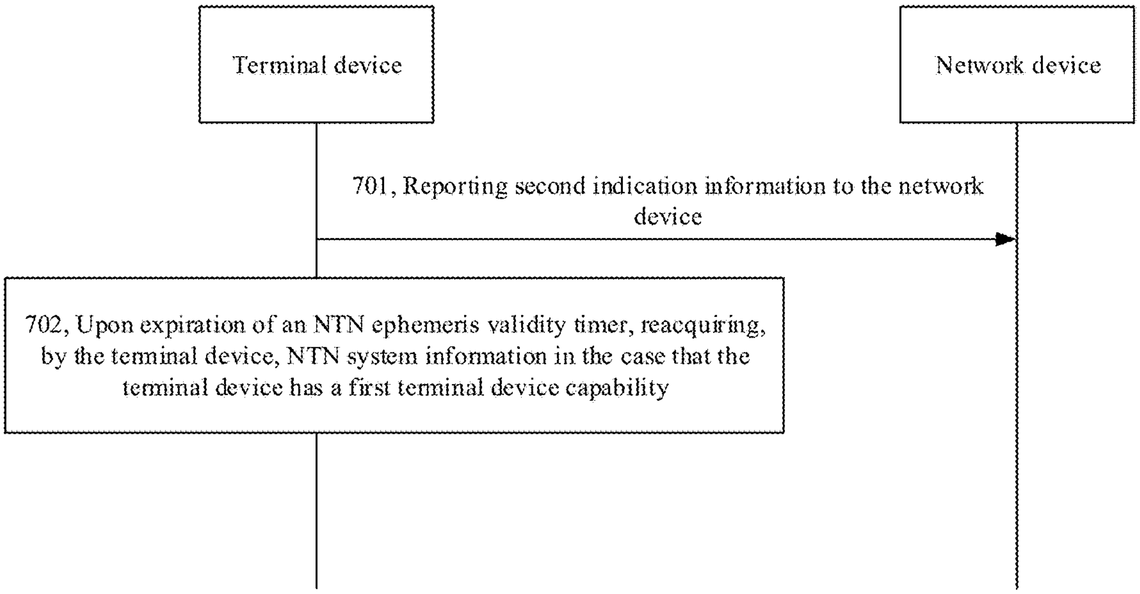

FIG. 7

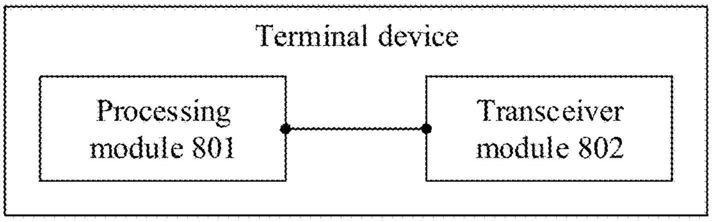

FIG. 8

METHOD FOR RESUMING UPLINK SYNCHRONIZATION, AND TERMINAL DEVICE AND STORAGE MEDIUM

CROSS-REFERENCE TO RELATED APPLICATION

This application is a continuation application of international application No. PCT/CN2022/070777, filed on Jan. 7, 2022, the entire contents of which are incorporated herein by reference.

TECHNICAL FIELD

The present disclosure relates to the field of communications, and in particular, relates to a method for resuming uplink synchronization, and a terminal device and a storage medium.

BACKGROUND

For characterization of the validity of ephemeris information and a common timing advance (common TA), a valid time mechanism is introduced into the current standard discussion for both the new radio (NR) non-terrestrial network (NTN) and the Internet of things (IoT) NTN, that is, a validity timer duration is defined for the ephemeris information and the common TA, and is configured by a network over system information. Upon acquiring satellite assistance information, a user equipment (UE) starts or restarts a validity timer at an epoch time corresponding to the satellite assistance information. In the case that the validity timer expires, the previously acquired ephemeris information and/or common TA is considered invalid, and meanwhile, the UE is considered to be out of uplink synchronization.

SUMMARY

Embodiments of the present disclosure provide a method for resuming uplink synchronization, and a terminal device and a storage medium thereof.

Some embodiments of the present disclosure provide a method for resuming uplink synchronization.

The method includes: prior to expiration of an NTN ephemeris validity timer or upon expiration of the NTN ephemeris validity timer, switching, by a terminal device, from a first bandwidth part (BWP) that is currently activated to an initial BWP and reading NTN system information on the initial BWP in a case that a first common search space is not configured on the first BWP; wherein the NTN system information includes ephemeris information of a serving satellite and/or a common TA, and wherein the terminal device is in a connected state, and the first common search space includes at least one of a search space for system information block 1 or a search space for other system information.

Some embodiments of the present disclosure provide a method for resuming uplink synchronization.

The method includes: reacquiring, by a terminal device, NTN system information in the case that an NTN ephemeris validity timer expires and the terminal device has a first terminal device capability, wherein the first terminal device capability indicates a capability of the terminal device for reading the NTN system information in a connected state, the NTN system information includes ephemeris information of a serving satellite and/or a common TA, and the terminal device is in the connected state.

Some embodiments of the present disclosure provide a terminal device. The terminal device includes:

a processing module, configured to, prior to expiration of an NTN ephemeris validity timer or upon expiration of the NTN ephemeris validity timer, switch from a first BWP that is currently activated to an initial BWP prior and read NTN system information on the initial BWP in the case that a first common search space is not configured on the first BWP, wherein the NTN system information includes ephemeris information of a serving satellite and/or a common TA, and wherein the terminal device is in a connected state, and the first common search space includes at least one of a search space for system information block 1 or a search space for other system information.

Some embodiments of the present disclosure provide a terminal device. The terminal device includes:

a processing module, configured to reacquire NTN system information in the case that an NTN ephemeris validity timer expires and the terminal device has a first terminal device capability, wherein the first terminal device capability indicates a capability of the terminal device for reading the NTN system information in a connected state, the NTN system information includes ephemeris information of a serving satellite and/or a common TA, and the terminal device is in the connected state.

Some embodiments of the present disclosure provide a terminal device. The terminal device includes a memory storing executable program codes, and a processor and a transceiver coupled to the memory. The processor and the transceiver are configured to perform the method as described above.

Some embodiments of the present disclosure provide a non-transitory computer-readable storage medium. The computer-readable storage medium stores one or more instructions. The one or more instructions, when loaded and executed by a computer, cause the computer to perform the method as described above.

Some embodiments of the present disclosure provide a chip. The chip is coupled to a memory in a terminal device, such that the chip, when calls program instructions stored in the memory during running, causes the terminal device to perform the method as described above.

BRIEF DESCRIPTION OF THE DRAWINGS

FIG. 6 is a schematic diagram illustrating that an NTN ephemeris validity timer expires and NTN system information is reacquired according to some embodiments of the present disclosure;

FIG. 7 is a schematic diagram of a method for resuming uplink synchronization according to some embodiments of the present disclosure;

FIG. 8 is a schematic diagram of a terminal device according to some embodiments of the present disclosure;

DETAILED DESCRIPTION

Figure 1A:
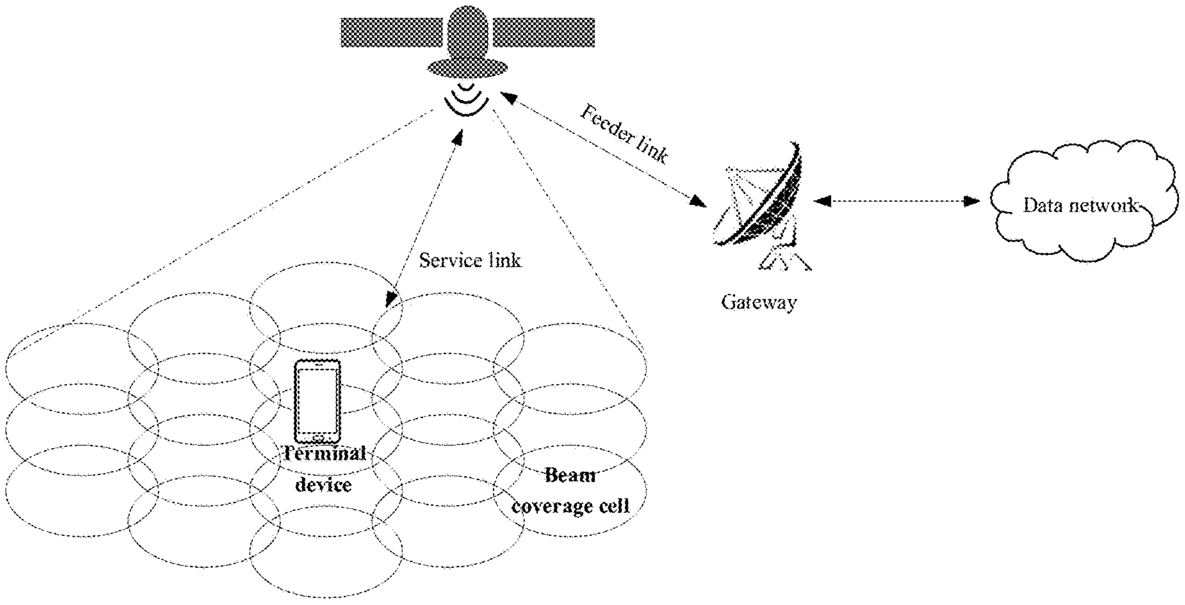
FIG. 1A is a schematic diagram of a transparent payload satellite network architecture.

The technical solutions in the embodiments of the present disclosure will be described below with reference to the accompanying drawings in the embodiments of the present disclosure. Apparently, the described embodiments are only a part, but not all of the embodiments of the present disclosure. Based on the embodiments in the present disclosure, all other embodiments acquired by those skilled in the art without creative efforts shall fall within the protection scope of the present disclosure.

Some of the terms involved in the present disclosure are briefly described hereinafter.

1. Related Background of NTNs

Currently, the 3rd Generation Partnership Project (3GPP) is researching the NTN technology, which generally provides communication services to ground users over satellite communication. Compared to ground-based cellular network communication, satellite communication has many unique advantages. Firstly, satellite communication is not restricted by user locations. For example, typical terrestrial communications cannot cover areas such as oceans, mountains, and deserts where communication devices cannot be installed, or regions where communication coverage is not available due to sparse population. However, for satellite communication, since a single satellite covers large ground areas and orbits the earth, theoretically, every corner of the earth can be covered by satellite communication. Secondly, satellite communication has significant social value. Satellite communication can cover remote mountainous areas, poor and underdeveloped countries or regions at lower costs, allowing people there to enjoy advanced voice communication and mobile internet technology. This helps bridge the digital gap between the underdeveloped countries or regions with the developed countries or regions and promotes development in these countries and regions. Thirdly, satellite communication features a longer communication distance, and increasing communication distance does not significantly increase communication costs. Lastly, satellite communication is highly stable and not subject to factors such as natural disasters.

Communication satellites are classified based on different orbital altitudes into low Earth orbit (LEO) satellites, medium Earth orbit (MEO) satellites, geostationary Earth orbit (GEO) satellites, high elliptical orbit (HEO) satellites, and the like. Currently, the research focuses on LEO and GEO satellites.

For LEO satellites, the orbital altitude ranges from 500 km to 1500 km, and the corresponding orbital period ranges from approximately 1.5 h to 2 h. The signal propagation delay for single-hop communication between terminals is generally less than 20 ms. The maximum satellite visibility time is 20 minutes. The signal propagation distance is short, with fewer link losses, and low requirements for transmission power at terminals.

For GEO satellites, the orbital altitude is 35786 km, and a period of rotation around the Earth is 24 h. The signal propagation delay for single-hop communication between users is generally 250 ms.

To ensure satellite coverage and increase the overall system capacity of the satellite communication system, satellites use multiple beams to cover the ground, and one satellite may form dozens or even hundreds of beams to cover the ground; and one satellite beam may cover a ground area with a diameter ranging from tens to hundreds of kilometers.

2. Satellite Network Architecture

Currently, in the 3GPP, two types of satellites are considered. One is transparent payload satellite, and the other is regenerative payload satellite.

Figure 1B:
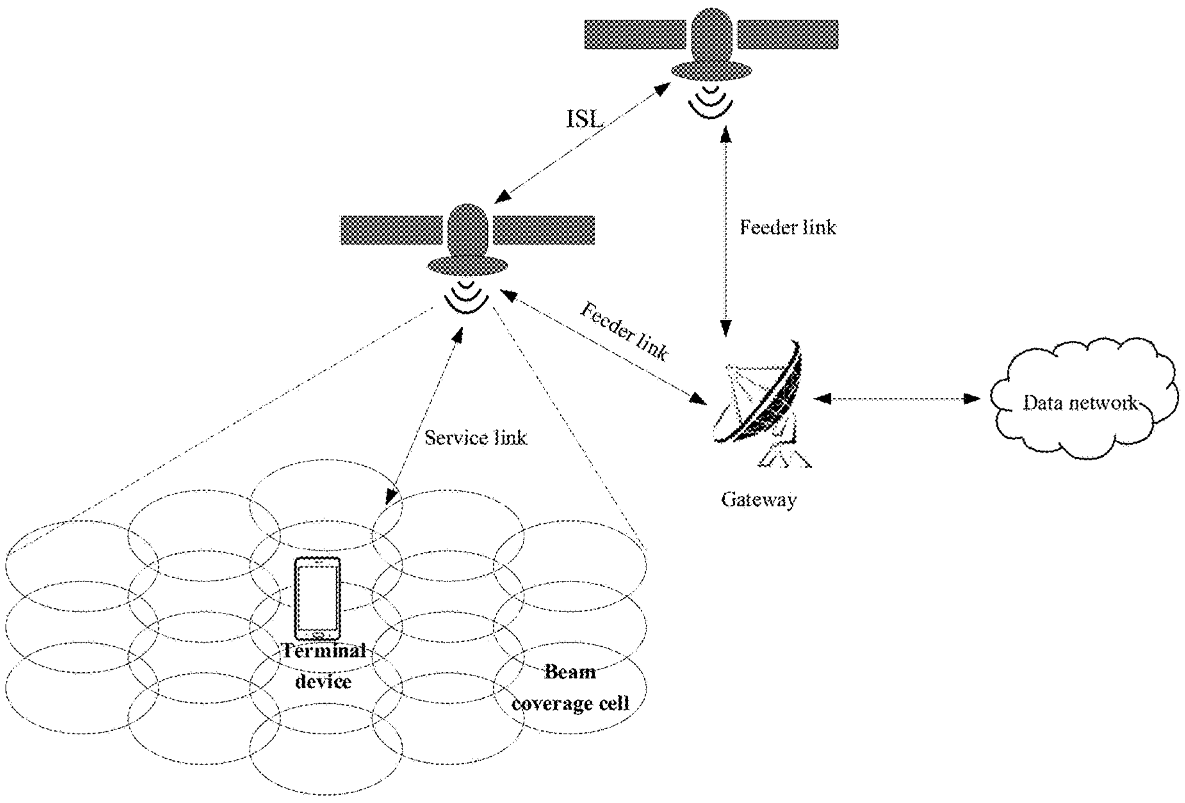
FIG. 1B is a schematic diagram of a regenerative payload satellite network architecture.

FIG. 1A is a schematic diagram of a transparent payload satellite network architecture. FIG. 1B is a schematic diagram of a regenerative payload satellite network architecture. The feeder link refers to a wireless link between a satellite and an NTN gateway (usually deployed on the ground).

An NTN network consists of the following network elements:

One or more gateways: the one or more gateways are configured to connect a satellite and a terrestrial public network.

A feeder link: is a link for communication between a gateway and a satellite.

A service link: is a link for communication between a terminal and a satellite.

Satellites: are divided into a transparent payload satellite and a regenerative payload satellite in terms of functionality.

Transparent payload satellite only provides radio frequency filtering, and frequency conversion and amplification functions, and only provides transparent payload of signals without changing waveform signals.

In addition to radio frequency filtering, and frequency conversion and amplification functions, the regenerative payload satellite also provides demodulation/decoding, routing/switching, and encoding/modulation functions. The regenerative payload satellite implements some or all of the functions of the gNB.

An inter-satellite link: is in a regenerative payload satellite network architecture.

3. NR Uplink TA

An important characteristic of uplink transmission is that different UEs are orthogonally multiple-access in time and frequency, that is, uplink transmissions from different UEs in the same cell do not interfere with each other.

To ensure the orthogonality of uplink transmission and avoid intra-cell interference, a new generation Node B (gNB) requires that the times when signals of different UEs from the same moment but different frequency domain resources arrive at the gNB are substantially aligned. To guarantee time synchronization on the gNB side, NR supports an uplink TA mechanism.

Figure 1C:
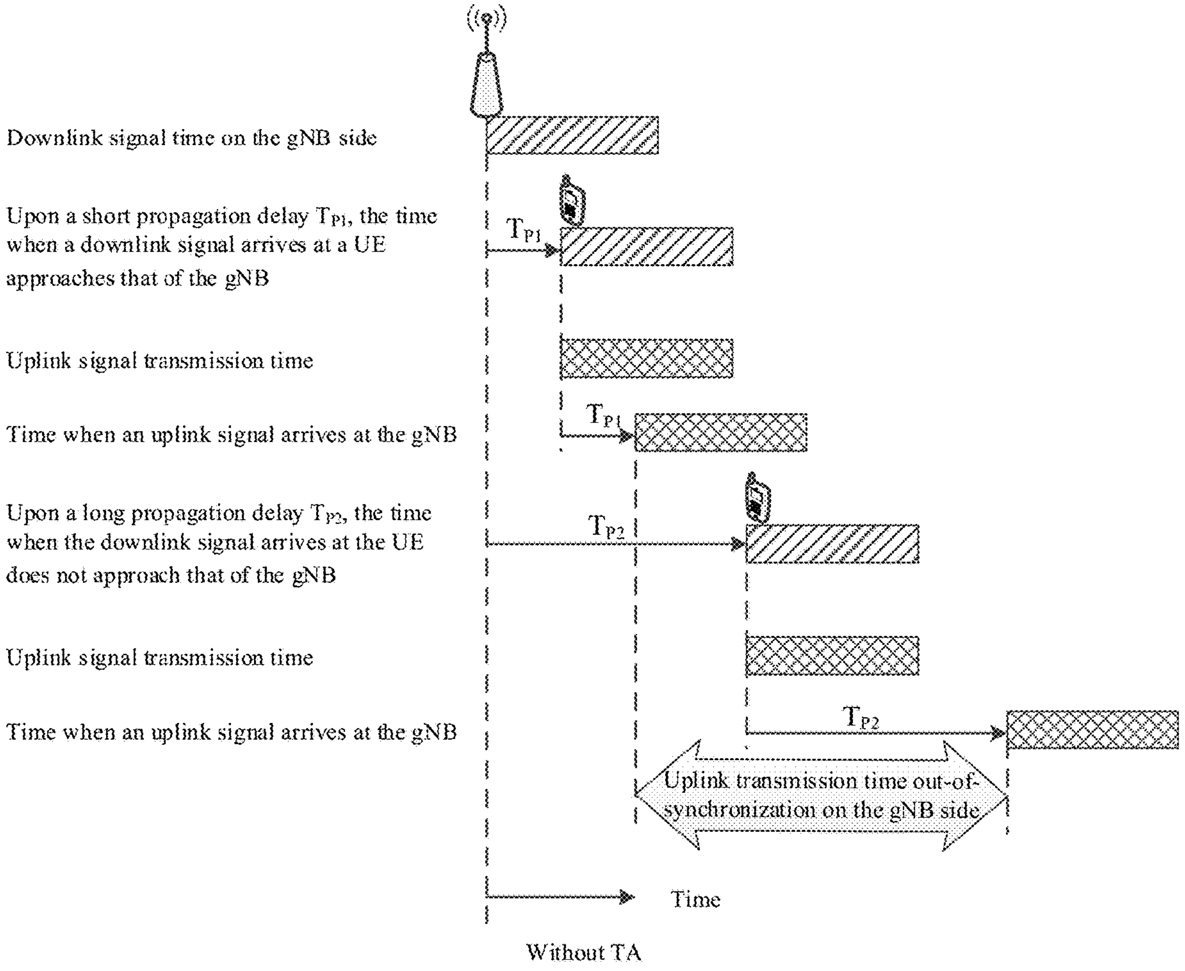
FIG. 1C is a schematic diagram of time synchronization on the gNB side in the related art.
Figure 1D:
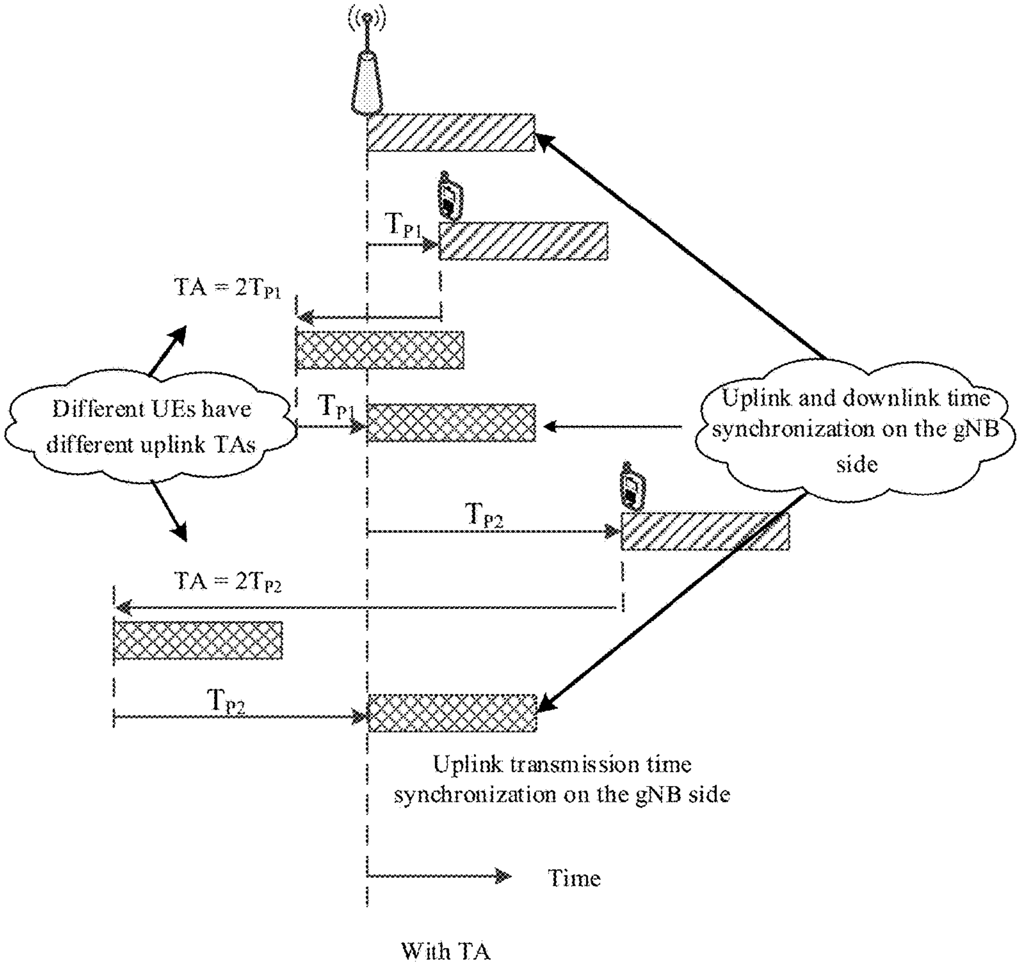
FIG. 1D is a schematic diagram of time synchronization on the gNB side in the related art.

An uplink clock and s downlink clock on the gNB side are the same, while an offset is present between the uplink clock and the downlink clock on the UE side, and different UEs have different uplink TAs. The gNB controls the times when uplink signals from different UEs arrive at the gNB by appropriately controlling the offset of each of the UEs. For a UE distal to the gNB, uplink data needs to be transmitted in advance due to a large transmission delay as compared with a UE closer to the gNB. As shown in FIG. 1C, a schematic diagram of time synchronization on the gNB side in the related art is illustrated. As shown in FIG. 1D, a schematic diagram of time synchronization on the gNB side in the related art is illustrated.

The gNB determines a TA value for each of UEs by measuring uplink transmission of the UE. The gNB transmits a TA command to a UE in two modes.

(1) Acquisition of an initial TA: in a random access procedure, the gNB determines a TA value by measuring a received random access preamble, and transmits the TA value to the UE over an uplink TA command field of a random access response (RAR).

(2) Adjustment of a TA in a radio resource control (RRC) connected state: although the UE and the gNB are in uplink synchronization during the random access procedure, the timing of the uplink signal arriving at the gNB may change over time, and thus the UE needs to continuously update the uplink TA thereof to maintain uplink synchronization. In the case that the TA of a certain UE needs to be corrected, the gNB will transmit a TA command to the UE to request the UE to adjust the uplink TA. The TA command is transmitted to the UE over a TA command medium access control-control element (MAC CE).

In a carrier aggregation (CA) scenario, a UE needs to use different TAs for different uplink carriers, and therefore the concept of timing advance group (TAG) is introduced into the standard. The network configures up to four TAGs for each cell group of the UE, while configuring an associated TAG for each serving cell. The UE maintains a TA for each TAG.

4. TA Maintenance in NTN

In a conventional terrestrial network (TN), a UE performs TA maintenance based on a TA command from the network. For Rel-17 NTN, assuming that the UE has both of global navigation satellite system (GNSS) positioning capability and TA pre-compensation capability, the UE is able to estimate a service link TA based on the UE position and the position of a serving satellite. Therefore, a TA determination mode combining open loop and closed loop is introduced into the NTN. Based on the current standardized conference conclusion, for NR NTN UEs in RRC_IDLE/INACTIVE and RRC_CONNECTED states, TAs thereof are determined by the following formula:

$$T_{TA} = (N_{TA} + N_{TA,UE-specific} + N_{TA,common} + N_{TA,offset}) \times T_c$$

$N_{TA}$ is defined as 0 for a scenario of transmitting a physical random access channel (PRACH), and is subsequently updated based on a TA command in Msg2 (message 2)/MsgB and a TA command MAC CE; and $N_{TA,UE\text{-}specific}$ is a service link TA estimated by the UE itself for TA pre-compensation. Specifically, the terminal acquires the position of a satellite according to the GNSS position information acquired by itself and satellite ephemeris information broadcasted by a serving cell, so as to calculate the propagation delay from the UE to a service link of the satellite;

$N_{TA,common}$ is a network controlled common TA containing any timing offset deemed necessary by the network; and $N_{TA,offset}$ is a fixed offset for calculating a TA.

5. Timing Relationship for the NTN System

In a terrestrial communication system, a propagation delay of signal communication is generally less than 1 millisecond (ms). In the NTN system, due to a long communication distance between a terminal device and a satellite (or a network device), the propagation delay of signal communication is large, which ranges from several tens of milliseconds to several hundreds of milliseconds, and is specifically associated with a satellite orbital altitude and a service type of satellite communication. To handle a large propagation delay, the timing relationship of the NTN system needs to be enhanced relative to an NR system.

Similar to the NR system, in the NTN system, a UE needs to consider the influence of a TA during uplink transmission. As the propagation delay in the system is large, the range of the TA value is also large. In the case that a UE is scheduled to perform uplink transmission in a slot n, the round-trip propagation delay is considered for the UE and the UE performs transmission in advance during uplink transmission, such that a signal, when arriving at the gNB side, is on the uplink slot n on the gNB side. Specifically, as shown in FIGS. 1E and 1F, schematic diagrams of timing relationships in an NTN system are provided.

Figure 1E:
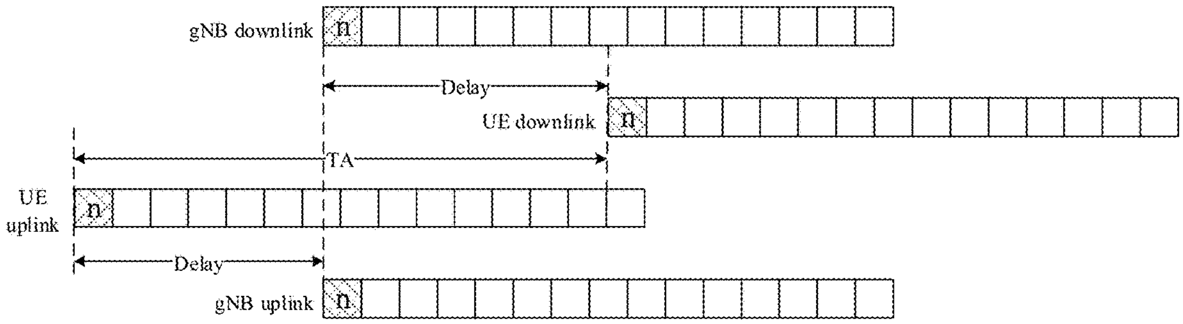
FIG. 1E is a schematic diagram of a timing relationship in an NTN system.

Case 1 is shown in FIG. 1E. Similar to the NR system, a downlink slot and an uplink slot on the gNB side are aligned. Accordingly, in order to align uplink transmissions of the UE with uplink slot on the gNB side, the UE needs to use a large TA value. During uplink transmission, a large offset value, such as $K_{offset}$, also needs to be introduced.

Figure 1F:
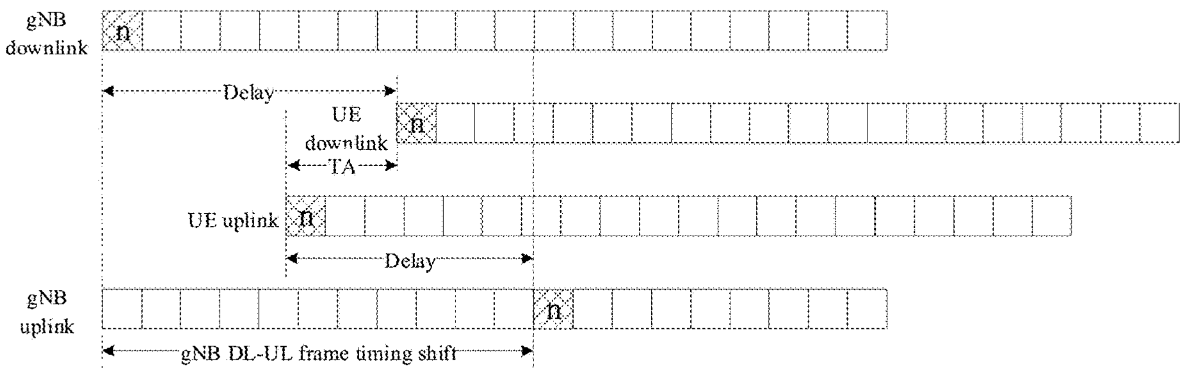
FIG. 1F is a schematic diagram of a timing relationship in an NTN system.

Case 2 is shown in FIG. 1F. An offset value is present between the downlink slot and the uplink slot on the gNB side. In this case, the UE only needs to use a small TA value in the case that uplink transmissions of the UE are aligned with uplink slots on the gNB side. However, in this case, the gNB needs additional scheduling complexity to process the corresponding scheduling timing.

6. Timing Relationship for the NR System

The timing relationship in the existing NR system is as follows:

Reception timing of physical downlink shared channel (PDSCH): in the case that a UE is scheduled by downlink control information (DCI) to receive a PDSCH, indication information of $K_0$ is included in the DCI, and the $K_0$ is configured to determine a slot for transmitting the PDSCH. For example, in the case that the scheduling DCI is received on a slot n, the slot allocated for PDSCH transmission is a slot $$\left\lfloor n \cdot \frac{2^{\mu_{PDSCH}}}{2^{\mu_{PDCCH}}} \right\rfloor + K_0,$$

wherein $K_0$ is determined based on a subcarrier spacing of the PDSCH, and $\mu_{PDSCH}$ and $\mu_{PDCCH}$ are respectively configured to determine subcarrier spacing configured for the PDSCH and a physical downlink control channel (PDCCH). $K_0$ ranges from 0 to 32.

Transmission timing of a physical uplink shared channel (PUSCH) scheduled by DCI: in the case that a UE is scheduled by the DCI to transmit a PUSCH, indication information of $K_2$ is included in the DCI, and the $K_2$ is configured to determine a slot for transmitting the PUSCH. For example, in the case that the scheduling DCI is received on a slot n, the slot allocated for PUSCH transmission is a slot $$\left\lfloor n\cdot\frac{2^{\mu_{PUSCH}}}{2^{\mu_{PDCCH}}}\right\rfloor+K_2,$$

wherein $K_2$ is determined based on subcarrier spacing of the PDSCH, and $\mu_{PUSCH}$ and $\mu_{PDCCH}$ are respectively configured to determine subcarrier spacing configured for the PUSCH and the PDCCH. $K_2$ ranges from 0 to 32.

Transmission timing of a PUSCH scheduled by a RAR grant: for a slot scheduled by RAR grant for PUSCH transmission, in the case that a UE initiates physical random access channel (PRACH) transmission, the ending position of the PDSCH including the corresponding RAR grant message received by the UE is within a slot n, and then the UE transmits the PUSCH on a slot $n+K_2+\Delta$, wherein $K_2$ and $\Delta$ are agreed by the protocol.

Transmission timing of hybrid automatic repeat request acknowledgement (HARQ-ACK) information on a physical uplink control channel (PUCCH): for a slot for PUCCH transmission, in the case that the ending position of PDSCH reception is within a slot n or the ending position of PDCCH reception indicating semi-persistent scheduling (SPS) PDSCH release is within the slot n, the UE should transmit the corresponding HARQ-ACK information on PUCCH resources within a slot $n+K_1$, wherein $K_1$ is the number of slots and is indicated by a PDSCH-to-HARQ-timing-indicator information field in a DCI format or provided by a dl-DataToUL-ACK parameter. $K_1=0$ means that the last slot for the PUCCH transmission is overlapped with the slot for the PDSCH reception or the PDCCH reception indicating the SPS PDSCH release.

MAC CE activation timing: in the case that HARQ-ACK information corresponding to PDSCH including a MAC CE command is transmitted on a slot n, the corresponding behavior indicated by the MAC CE command and the downlink configuration assumed by the UE should take effect from the first slot following a slot $$n+3N_{slot}^{subframe,\mu},$$

wherein $$N_{slot}^{subframe,\mu}$$

represents the number of slots included in each subframe for the subcarrier spacing configuration μ.

Transmission timing of channel state information (CSI) on a PUSCH: the CSI transmission timing on PUSCH is the same as the transmission timing of DCI scheduled PUSCH transmission in general.

CSI reference resource timing: a CSI reference resource for reporting the CSI on an uplink slot n' is determined based on a single downlink slot $n-n_{CSI\_ref}$, wherein $$n=\left\lfloor n'\cdot\frac{2^{\mu_{DL}}}{2^{\mu_{UL}}}\right\rfloor,$$

and $\mu_{DL}$ and $\mu_{UL}$ are downlink and uplink subcarrier spacing configurations, respectively. The value of $n_{CSI\_ref}$ depends on the type of CSI reporting.

Transmission timing of aperiodic sounding reference signal (SRS): in the case that the UE receives DCI on a slot n to trigger transmission of the aperiodic SRS, the UE transmits the aperiodic SRS in each triggered SRS resource set on a slot $$\left\lfloor n\cdot 2^{\frac{\mu_{SRS}}{\mu_{PDCCH}}}\right\rfloor+k,$$

wherein k is configured based on a higher-layer parameter slotOffset in each triggered SRS resource set and is determined based on a subcarrier spacing corresponding to the triggered SRS transmission, and $\mu_{SRS}$ and $\mu_{PDCCH}$ are subcarrier spacing configurations of the triggered SRS transmission and the PDCCH carrying a triggering command.

7. Timing Enhancement for the NTN System

The PDSCH reception timing in an NR system is only affected by the timing on a downlink reception side and is not affected by a large transmission round-trip delay in the NTN system, and thus in the NTN system, the PDSCH reception timing in the NR system can be reused.

For other timing affected by the interaction between downlink reception and uplink transmission, the timing relationship needs to be enhanced to operate normally in the NTN system or to overcome the large transmission delay in the NTN system. A simple solution is to introduce an offset parameter $K_{offset}$ in the system and apply this parameter to the associated timing relationship.

Transmission timing of DCI scheduled PUSCH (including CSI transmitted on PUSCH): in the case that the scheduling DCI is received on a slot n, the slot allocated for PUSCH transmission is a slot $$\left\lfloor n\cdot\frac{2^{\mu_{PUSCH}}}{2^{\mu_{PDCCH}}}\right\rfloor+K_2+K_{offset}.$$

Transmission timing of RAR grant scheduled PUSCH: for a slot scheduled by RAR grant for PUSCH transmission, the UE transmits the PUSCH on a slot $n+K_2+\Delta+K_{offset}$.

Transmission timing of HARQ-ACK on a PUCCH: for a slot for PUCCH transmission, a UE should transmit corresponding HARQ-ACK information over PUCCH resources within a slot $n+K_1+K_{offset}$.

MAC CE activation timing: in the case that HARQ-ACK information corresponding to a PDSCH including a MAC CE command is transmitted on a slot n, the corresponding behavior indicated by the MAC CE command and the downlink configuration assumed by the UE should take effect from the first slot following a slot $$n + XN_{slot}^{subframe,\mu} + K_{offset},$$

wherein the value of X may be determined based on the UE capability of NTN and may not necessarily be 3.

CSI reference resource timing: the CSI reference resource for reporting CSI on an uplink slot n' is determined based on a single downlink slot $n-n_{CSI\_ref}-K_{offset}$.

Aperiodic SRS transmission timing: in the case that a UE receives DCI to trigger transmission of the aperiodic SRS on a slot n, the UE transmits the aperiodic SRS in each triggered SRS resource set on a slot $$\left\lfloor n \cdot 2^{\frac{\mu_{SRS}}{\mu_{PDCCH}}} \right\rfloor + k + K_{offset}.$$

Based on the current progress of NTN standardization in the 3GPP, the following conclusions have been made for the configuration of $K_{offset}$.

1. The network configures cell-level common $K_{offset}$ by means of broadcasting.
2. For the initial random access procedure, the network configures cell-level $K_{offset}$ by means of broadcasting.
3. For a UE in a connected state, the network configures UE-specific $K_{offset}$ based on RRC signaling or MAC.
4. In the case that the network does not configure UE-specific $K_{offset}$, the UE uses the broadcasted $K_{offset}$.

Based on the present understanding, the network configures the $K_{offset}$ value primarily with reference to TA. For example, for $K_{offset}$ broadcasted by the network, the network needs to configure $K_{offset}$ according to the maximum TA supported within the cell; and for UE-specific $K_{offset}$, the network configures $K_{offset}$ with reference to the TA of the UE. In order to assist the network to configure the UE-specific $K_{offset}$, a TA reporting mechanism is introduced in the NTN.

In an NTN system, ephemeris information and a common TA are both broadcasted over serving cell system information. As the ephemeris information needs to be updated periodically (e.g., the position of a satellite, or the moving direction, and the moving speed), in order to enable the terminal to correctly use the position of the satellite for TA compensation, a terminal needs to use valid ephemeris information for calculation. Similarly, a common TA is propagation delay from a reference point (RP, on which uplink timing and downlink timing are aligned) of network broadcasting to a satellite, and is configured to provide TA pre-compensation for part of feeder links, and the UE also needs to acquire a valid common TA value to calculate the TA finally used for uplink transmission.

For characterization of the validity of ephemeris information and a common TA, a valid time mechanism is introduced into the current standard discussion for both the NR NTN and the IoT NTN, that is, a validity timer duration is defined for the ephemeris information and the common TA, and is configured by a network over system information. Upon acquiring satellite assistance information, a UE starts or restarts a validity timer at an epoch time corresponding to the satellite assistance information. In the case of expiration of the validity timer, the previously acquired ephemeris information and/or common TA is considered invalid, and meanwhile, the UE is considered to be out of uplink synchronization. For an NR UE, in the case that the UE configures searchSpaceSIB1 (search space for system information block 1) and searchSpaceOtherSystemInformation on an activated BWP, the UE may acquire ephemeris information and/or a common TA by reading system information. In the case that the UE does not configure searchSpaceSIB1 or searchSpaceOtherSystemInformation on the activated BWP, a network informs the UE of ephemeris information and/or a common TA over an RRC reconfiguration message. For IoT UEs (including narrow band internet of things (NB-IoT) and enhanced machine-type communication (eMTC) UEs), the UEs acquire ephemeris information and/or a common TA only by reading system information, and based on current standard specifications, NB-IoT and eMTC UEs in an RRC connected state are not capable of reading system information. How the UE reacquires the system information prior to expiration of the validity timer to acquire ephemeris information and/or a common TA to maintain uplink synchronization, and how the UE resumes uplink synchronization in the case that the validity timer expires, need to define the behavior of the UE from a standard level.

The technical solutions according to the embodiments of the present disclosure are applicable to various communication systems, such as a global system of mobile communication (GSM) system, a code division multiple access (CDMA) system, a wideband code division multiple access (WCDMA) system, general packet radio service (GPRS) system, a long-term evolution (LTE) system, an advanced long-term evolution (LTE-A) system, an NR system, an evolution system of an NR system, an LTE-based access to unlicensed spectrum (LTE-U) system, an NR-based access to unlicensed spectrum (NR-U) system, an NTN system, a universal mobile telecommunication system (UMTS), a wireless local area network (WLAN) system, a wireless fidelity (Wi-Fi) system, a 5th generation (5G) system, or other communication systems.

Generally, conventional communication systems support a limited number of connections and are easy to implement. However, with the development of communication technologies, mobile communication systems will support not only conventional communications, but also other communications, such as device-to-device (D2D) communications, machine-to-machine (M2M) communications, machine-type communications (MTCs), vehicle-to-vehicle (V2V) communications, or vehicle-to-everything (V2X) communications. The embodiments of the present disclosure are also applicable to these communication systems.

In some embodiments, the communication systems in the embodiments of the present disclosure are applicable to a CA scenario, to a dual connectivity (DC) scenario, and to a standalone (SA) networking scenario.

In some embodiments, the communication systems in the embodiments of the present disclosure are applicable to an unlicensed spectrum, where the unlicensed spectrum is considered as a shared spectrum. Alternatively, the communication systems in the embodiments of the present disclosure are also applicable to a licensed spectrum, where the licensed spectrum is considered as an unshared spectrum.

The embodiments of the present disclosure are described in conjunction with a network device and a terminal device. The terminal device may also be referred to as a UE, an access terminal, a user unit, a user station, a mobile station, a mobile, a remote station, a remote terminal, a mobile device, a user terminal, a terminal, a wireless communication device, a user agent, a user device, or the like.

The terminal device may be a station (ST) in WLAN, or may be a cellular phone, a cordless phone, a Session Initiation Protocol (SIP) phone, a wireless local loop (WLL)

station, a personal digital assistant (PDA) device, a handheld device with a wireless communication function, a computing device, or another processing device connected to a wireless modem, a vehicle-mounted device, a wearable device, a terminal device in a next generation communication system, such as an NR network, or a terminal device in an evolved public land mobile network (PLMN), or the like.

In the embodiments of the present disclosure, the terminal device may be deployed on land, including indoor or outdoor, handheld, wearable or vehicle-mounted; may be deployed on water (such as a ship); or may be deployed in the air (such as an airplane, a balloon, or a satellite).

In the embodiments of the present disclosure, the terminal device may be a mobile phone, a tablet computer (or referred to as a pad), a computer with a wireless transceiving function, a virtual reality (VR) terminal device, an augmented reality (AR) terminal device, a wireless terminal device in industrial control, a wireless terminal device in self-driving, a wireless terminal device in a remote medical system, a wireless terminal device in a smart grid, a wireless terminal device in transportation safety, a wireless terminal device in a smart city, a wireless terminal device in smart home, or the like.

By way of example and not limitation, in the embodiments of the present disclosure, the terminal device may be a wearable device. The wearable device also be referred to as a wearable smart device, is a general name of wearable devices, such as glasses, gloves, watches, clothing, and shoes, which are intelligently designed and developed for daily wear by using wearable technologies. The wearable device is a portable device that is directly worn or integrated into the user's clothing or accessory. The wearable device is not only a hardware device, but also implements powerful functions by software support, data interaction, and cloud interaction. The wearable smart devices in a broad sense include devices such as smart watches or smart glasses that have full functionality and large size and are capable of implementing all or part of functionality without depending on smart phones, and devices such as various smart bracelets or smart jewelry used for monitoring physical signs, which are dedicated to a specific type of application functions and need to be used in cooperation with other devices such as smart phones.

In the embodiments of the present disclosure, the network device may be a device for communication with a mobile device. The network device may also be referred to as an access point (AP) in WLAN, a base transceiver station (BTS) in GSM or CDMA, a NodeB (NB) in WCDMA, an evolutional Node B (eNB, or eNodeB) in LTE, a relay station or an access point, a vehicle-mounted device, a wearable device, a network device (gNB) in an NR network, a network device in an evolved PLMN network, or a network device in an NTN network.

By way of example but not limitation, in the embodiments of the present disclosure, the network device may have mobility capabilities. For example, the network device is a mobile device. In some embodiments, the network device is a satellite, or a balloon station. For example, the satellite is an LEO satellite, an MEO satellite, a GEO satellite, an HEO satellite, or the like. In some embodiments, the network device is a base station deployed on land, in water, or the like.

In the embodiments of the present disclosure, the network device may provide a service for a cell. Terminal device communicates with the network device over a transmission resource (e.g., a frequency domain resource or a frequency spectrum resource) used by the cell. The cell is a cell corresponding to the network device (e.g., a base station). The cell may belong to a macro base station or to a base station corresponding to a small cell. The small cell includes a metro cell, a micro cell, a pico cell, a femto cell, or the like. The small cell has the characteristics of small coverage and low transmission power, and is applicable to providing high-rate data transmission services.

Figure 2:
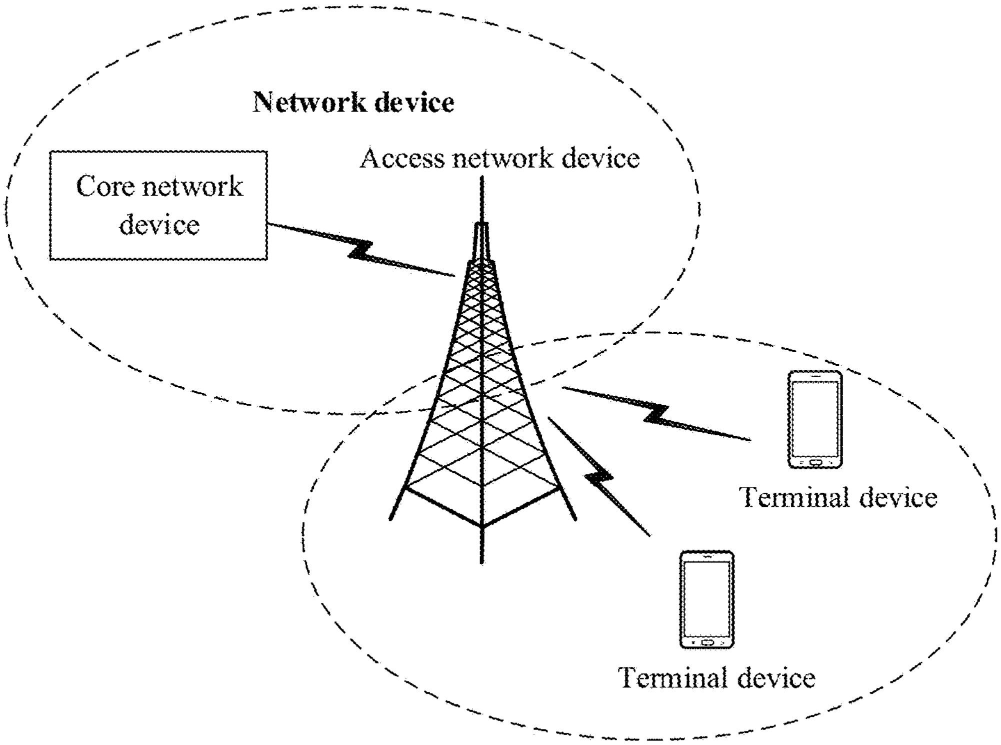
FIG. 2 is a system architecture diagram of a communication system to which the embodiments of the present disclosure are applicable.

FIG. 2 is a system architecture diagram of a communication system to which the embodiments of the present disclosure are applicable. The communication system includes a network device, and the network device is a device communicating with a terminal device (or referred to as a communication terminal, or a terminal). The network device provides communication coverage for a specific geographic region and communicates with terminal devices within the coverage. FIG. 2 exemplarily shows one network device and two terminal devices. In some embodiments, the communication system includes a plurality of network devices, and each of the network devices covers other number of terminal devices, which is not limited in the embodiments of the present disclosure. In some embodiments, the communication system further includes other network entities, such as a network controller, and a mobile management entity, which is not limited in the embodiments of the present disclosure.

The network device further includes an access network device and a core network device. Namely, the wireless communication system further includes a plurality of core networks configured to communicate with the access network device. The access network device may be an LTE system, a next-generation (mobile communication or NR) system, or an evolutional Node B (eNB or e-NodeB for short) in an authorized auxiliary access long-term evolution (LAA-LTE) system, a macro Node B, a micro Node B (also referred to as a "small Node B"), a pico Node B, an AP, a transmission point (TP), a new-generation Node B (gNodeB), or the like.

It should be understood that a device having a communication function in the network/system in the embodiments of the present disclosure may be referred to as a communication device. In the communication system shown in FIG. 2, for example, the communication device includes a network device and terminal devices having a communication function, and the network device and the terminal devices are devices that have been specifically described above, which are not described herein any further. The communication device further includes other devices, such as a network controller, a mobile management entity or other network entities in the communication system, which is not limited in the embodiments of the present disclosure.

Figure 3:
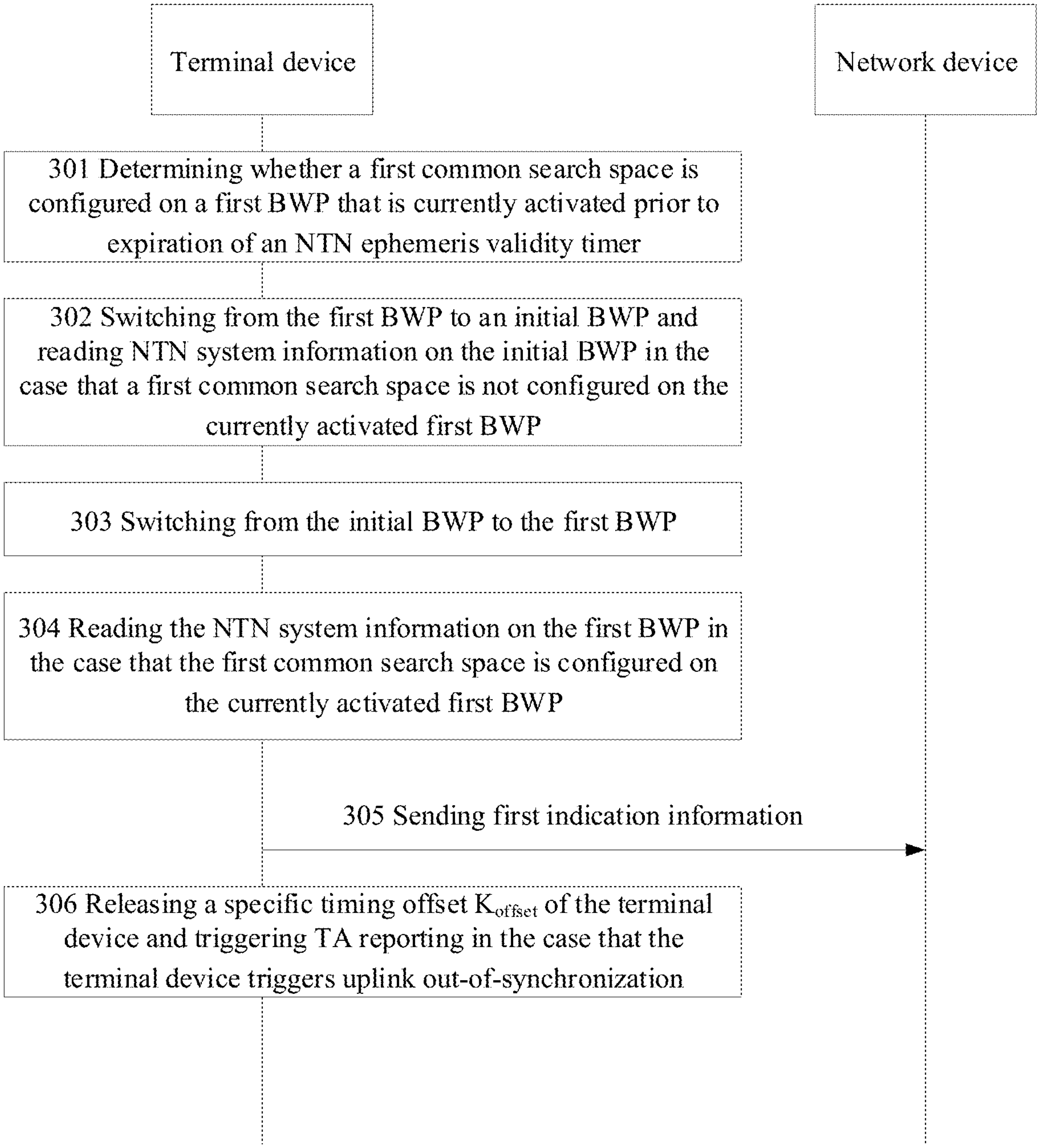
FIG. 3 is a schematic diagram of a method for resuming uplink synchronization according to some embodiments of the present disclosure.

The technical solutions according to the present disclosure are described hereinafter through embodiments. As shown in FIG. 3, a schematic diagram of a method for resuming uplink synchronization according to some embodiments of the present disclosure is given. The method includes the following processes.

In process 301, whether a first common search space is configured on a first BWP that is currently activated is determined prior to expiration of an NTN ephemeris validity timer.

In the process, the first common search space includes a search space for system information block 1 (searchSpaceSIB1) and a search space for other system information (searchSpaceOtherSystemInformation). The searchSpaceSIB1 indicates a PDCCH search space scheduled by SIB1, and the searchSpaceOtherSystemInformation indicates a PDCCH search space scheduled by system information (SI).

Processes 302 and 303 are performed in the case that a first common search space is not configured, and processes 304 and 305 are performed in the case that the first common search space is configured. For a UE in an RRC connected state, the UE acquires ephemeris information of a serving satellite and related parameters such as a common TA by reading a broadcast or receiving an RRC reconfiguration message. The embodiments of the present disclosure are applicable to NR NTN scenarios.

In process 302, prior to expiration of the NTN ephemeris validity timer, in the case that a first common search space is not configured on a first BWP that is currently activated, a terminal device switches from the first BWP to an initial BWP and reads NTN system information on the initial BWP, wherein the NTN system information includes ephemeris information of a serving satellite and/or a common TA, the terminal device is in a connected state, and the first common search space includes at least one of a search space for system information block 1 or a search space for other system information.

It should be understood that the UE re-reads the NTN system information (NTN-SIBx) prior to expiration of the NTN ephemeris validity timer to acquire updated ephemeris information of the serving satellite, and/or common TA information. For example, for a UE in an RRC connected state, prior to expiration of the NTN ephemeris validity timer, in the case that the UE does not configure searchSpaceSIB1 and/or searchSpaceOtherSystemInformation on a first BWP that is currently activated, the UE switches from the first BWP that is currently activated to an initial BWP, and the UE re-reads NTN-SIBx on the initial BWP, wherein the NTN-SIBx includes ephemeris information of the serving satellite and/or related parameters such as a common TA.

In some embodiments, the method further includes: in the case that the terminal device switches from the first BWP to the initial BWP and a BWP-inactivity timer corresponding to the first BWP is running, the terminal device stops or pauses the inactivity timer. For example, the UE switches from the currently activated first BWP to the initial BWP while stopping or pausing the running first BWP-inactivity timer corresponding to the first BWP in the case that the BWP-inactivity timer is running.

In process 303, in response to reading the NTN system information on the initial BWP, the terminal device switches from the initial BWP to the first BWP.

In some embodiments, the method further includes: starting or resuming the running of the BWP-inactivity timer corresponding to the first BWP in the case that the terminal device switches from the initial BWP to the first BWP.

For example, the UE re-switches to the first BWP upon re-reading NTN-SIBx on the initial BWP. Meanwhile, in the case that the UE previously triggers to switch from the first BWP to the initial BWP, the BWP-inactivity timer corresponding to the first BWP is running, and then the UE starts or resumes the operation of the BWP-inactivity timer corresponding to the first BWP in the case that the UE re-switches from the initial BWP to the first BWP.

In process 304, prior to expiration of the NTN ephemeris validity timer, in the case that a first common search space is configured on the first BWP that is currently activated, the terminal device reads the NTN system information on the first BWP.

In the process, the NTN system information includes a search space for system information block 1 (searchSpaceSIB1) and a search space for other system information (searchSpaceOtherSystemInformation).

For example, for a UE in an RRC connected state, prior to expiration of the NTN ephemeris validity timer, in the case that the UE configures searchSpaceSIB1 and searchSpaceOtherSystemInformation on an activated first BWP, the UE reads NTN-SIBx on the activated first BWP, wherein the NTN-SIBx includes ephemeris information of a serving satellite and/or related parameters such as a common TA.

In some embodiments, upon reading the NTN system information, the terminal device starts or restarts the NTN ephemeris validity timer at an epoch time corresponding to the NTN system information.

For example, upon re-reading the NTN-SIBx and prior to expiration of the NTN ephemeris validity timer, the UE starts or restarts the NTN ephemeris validity timer at an epoch time corresponding to the ephemeris information of the serving satellite and the common TA information that are configured by the NTN-SIBx. How the UE re-reads the NTN-SIBx (e.g., at which time the UE re-reads the NTN-SIBx specifically) depends on the UE implementation.

It should be noted that processes 301, 303 and 304 are optional.

In process 305, the terminal device transmits first indication information to a network device, wherein the first indication information indicates state information of the NTN ephemeris validity timer.

Figure 4:
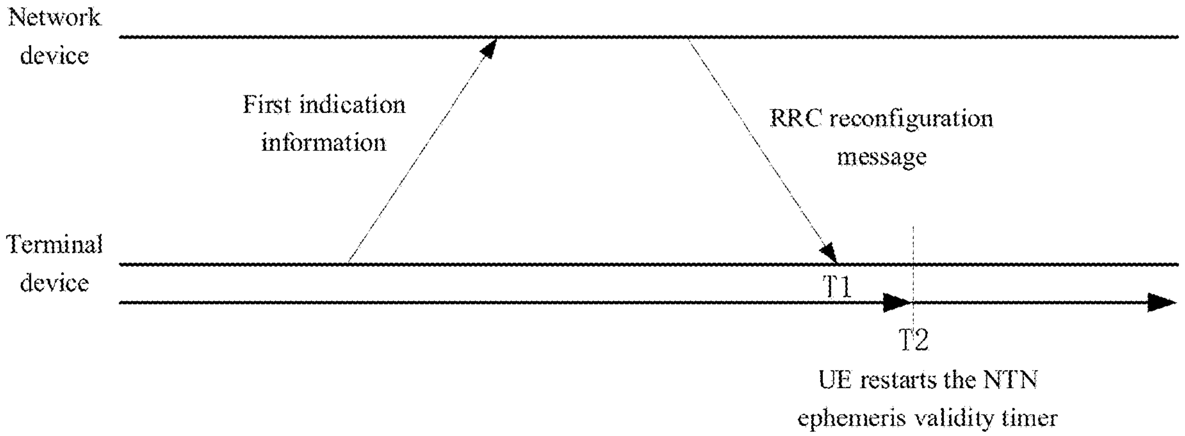
FIG. 4 is a schematic diagram illustrating that a terminal device transmits first indication information to a network device according to some embodiments of the present disclosure.

It should be understood that the network device allows the UE to report the state information of the NTN ephemeris validity timer to the network device. That is, the UE transmits the first indication information to the network device, the first indication information indicates the state information of the NTN ephemeris validity timer maintained by the UE. As shown in FIG. 4, a schematic diagram illustrating that a terminal device transmits first indication information to a network device according to some embodiments of the present disclosure is given. In FIG. 4, the terminal device acquires ephemeris information of a serving satellite and/or common TA information at time T1, and an epoch time corresponding to the ephemeris information of the serving satellite and/or the common TA information is T2.

In some embodiments, the method further includes: reporting, by the terminal device, to the network device that the terminal device has a capability of sending the first indication information based on a terminal capability. That is, the UE reports, based on a UE capability, to the network device to indicate the UE having a capability of sending the first indication information.

In some embodiments, the process that the terminal device transmits the first indication information to the network device includes: transmitting, by the terminal device, the first indication information to the network device in the case that any one of the following conditions is satisfied:

(1) The network device configures the terminal device with the permission to report the first indication information. It should be understood that the network device configures the UE with the permission (whether) to transmit the first indication information based on the UE capability. The UE transmits the first indication information to the network device only in the case that the network device configures the UE with the permission to report the first indication information.

(2) A first common search space is not configured on the first BWP, wherein the first common search space includes searchSpaceSIB1 and/or searchSpaceOtherSystemInformation. For example, the UE transmits the first indication information only in the case that no searchSpaceSIB1 or searchSpaceOtherSystemInformation is configured on the currently activated BWP.

(3) The first common search space is configured on the first BWP, wherein the first common search space includes searchSpaceSIB1 and searchSpaceOtherSystemInformation. For example, the UE transmits the first indication information only in the case that searchSpaceSIB1 and searchSpaceOtherSystemInformation are configured on the currently activated BWP. Further, the UE transmits the first indication information only upon reading the ephemeris information of the serving satellite and the related parameters such as a common TA on the currently activated BWP.

(4) The terminal device switches from the first BWP to a second BWP, the first common search space is configured on the first BWP, and the first common search space is configured on the second BWP. For example, the UE switches from the first BWP to a second BWP, wherein searchSpaceSIB1 and searchSpaceOtherSystemInformation are configured on the first BWP, and searchSpaceSIB1 or searchSpaceOtherSystemInformation is not configured on the second BWP.

(5) The terminal device receives a request from the network device. Namely, the UE triggers to report the first indication information based on the request of the network device.

(6) The network device configures the terminal device with the permission to report the first indication information, and a first common search space is not configured on the first BWP, wherein the first common search space includes searchSpaceSIB1 and/or searchSpaceOtherSystemInformation.

(7) The network device configures the terminal device with the permission to report the first indication information, and the first common search space is configured on the first BWP, wherein the first common search space includes searchSpaceSIB1 and searchSpaceOtherSystemInformation.

(8) The network device configures the terminal device with the permission to report the first indication information and switch from the first BWP to the second BWP, the first common search space is configured on the first BWP, and a first common search space is not configured on the second BWP. For example, the UE configures searchSpaceSIB1 and searchSpaceOtherSystemInformation on the first BWP, and the UE does not configure searchSpaceSIB1 or searchSpaceOtherSystemInformation on the second BWP.

(9) The network device configures the terminal device with the permission to report the first indication information and the terminal device receives a request from the network device.

(10) The terminal device transmits the first indication information according to a preset algorithm. That is, when the UE triggers to transmit the first indication information depends on the UE implementation, and the UE transmits the first indication information according to its own algorithm.

In some embodiments, the state information of the NTN ephemeris validity timer includes at least one of:

1) The time when the terminal device last starts the NTN ephemeris validity timer. For example, the time when the UE last starts the NTN ephemeris validity timer, may be represented as at least one of an uplink (UL)/downlink (DL) system frame number (SFN) at the UE or a first reference point, a UL/DL subframe number at the UE or a first reference point, or a universal time coordinated (UTC).

2) The time when the NTN ephemeris validity timer expires. For example, the time when the NTN ephemeris validity timer expires, may be represented as at least one of a UL/DL SFN at the UE or a first reference point, a UL/DL subframe number at the UE or a first reference point, or a UTC.

3) A running state of the NTN ephemeris validity timer at a first reference time for the terminal device, wherein the first reference time is not earlier than the time when the terminal device last starts the NTN ephemeris validity timer. For example, for the first reference time and the running state of the NTN ephemeris validity timer at the first reference time (e.g., the remaining time of the NTN ephemeris validity timer from the first reference time to the expiration time), the first reference time is not earlier than the time when the UE last starts the NTN ephemeris validity timer, and the first reference time may be represented as at least one of a UL/DL SFN at the UE or the first reference point, a UL/DL subframe number at the UE or the first reference point, or a UTC at the UE or the first reference point.

In some embodiments, a reference point of the time is at least one of a UL/DL system SFN at the terminal device or a first reference point, a UL/DL subframe number at the terminal device or a first reference point, or a UTC. The first reference point is a reference point where DL timing and UL timing corresponding to a current serving cell are aligned.

In some embodiments, the first indication information is carried by RRC signaling or MAC CE signaling. For example, the first indication information is carried by RRC signaling (e.g., UE assistance information (UAI)), a MAC CE, or the like.

In this implementation, the terminal device is allowed to report state information of the NTN ephemeris validity timer to the network device. By introduction of the reporting of the validity timer state information, in the case that the terminal device is not capable of reading the NTN system information on the activated BWP, the terminal device assists the network device to inform the terminal device of the serving satellite ephemeris and/or common TA related information over the RRC reconfiguration message. This solution also avoids to a certain extent, the occurrence of uplink out-of-synchronization caused by expiration of validity timer due to the terminal device being not capable of reading NTN system information on an activated BWP.

It should be noted that the execution sequence of process 305 and processes 301 to 304 is not limited.

In process 306, in the case that the terminal device triggers uplink out-of-synchronization, the terminal device releases the specific timing offset ($K_{offset}$) of the terminal device and triggers TA reporting.

It should be understood that in the case that uplink out-of-synchronization of the UE occurs, the UE releases the UE-specific timing offset ($K_{offset}$) and triggers TA reporting. That is, the UE in an RRC connected state triggers uplink out-of-synchronization, and in the case that the network device configures the UE with the UE-specific $K_{offset}$, the UE releases the UE-specific $K_{offset}$.

In some embodiments, a condition for triggering the uplink out-of-synchronization includes at least one of:

a TA timer (timeAlignmentTimer) expires;

the NTN ephemeris validity timer expires; or a global navigation satellite system (GNSS) validity timer expires, wherein the GNSS validity timer is applicable to an internet of things terminal device (applicable only to IoT NTN).

In some embodiments, the process that in the case that the terminal device triggers uplink out-of-synchronization, the terminal device releases the specific timing offset $K_{offset}$ includes:

in the case that uplink out-of-synchronization for the terminal device occurs, releasing, by the terminal device, the specific timing offset $K_{offset}$; for example, in the case that uplink out-of-synchronization of the UE occurs, the UE-specific $K_{offset}$ is released; or in the case that uplink out-of-synchronization for the terminal device occurs and terminal device initiates a random access procedure, releasing, by the terminal device, the specific timing offset $K_{offset}$. For example, the UE-specific $K_{offset}$ is released in the case that the UE initiates the random access procedure.

It should be noted that the terminal device triggers TA reporting in process 306 is optional.

In some embodiments, the process that the terminal device triggers TA reporting includes:

in the case that the network device configures TA reporting, the terminal device triggers TA reporting; for example, in the case that the network device configures the UE with TA reporting, the UE triggers TA reporting in response to initiating the random access procedure; or in the case that the system information instructs the terminal device to report a TA in a random access procedure, the terminal device triggers TA reporting in response to initiating the random access procedure. For example, in the case that the system information instructs the UE to report the TA in the random access procedure, the UE triggers TA reporting in response to initiating the RACH.

In this implementation, in the case that uplink out-of-synchronization for the terminal device occurs, the terminal device releases UE-specific $K_{offset}$ and triggers TA reporting. The occurrence of unavailable UE-specific $K_{offset}$ due to the over-change of the UE TA is avoided to a certain extent.

It should be noted that the execution sequence of process 306 and processes 301 to 305 is not limited.

In the embodiments of the present disclosure, prior to expiration of the NTN ephemeris validity timer, in the case that a first common search space is not configured on a first BWP that is currently activated, a terminal device switches from the first BWP to an initial BWP, and reads NTN system information on the initial BWP, wherein the NTN system information includes ephemeris information of a serving satellite and/or a TA, the terminal device is in a connected state, and the first common search space includes at least one of a search space for system information block 1 or a search space for other system information. Prior to expiration of an NTN ephemeris validity timer, in the case that a first common search space is configured on a first BWP that is currently activated, the terminal device reads the NTN system information on the first BWP. That is, by introduction of a mechanism that the terminal device automatically switches the BWP prior to expiration of the validity timer expires to re-read the NTN-SIBx to acquire the serving satellite ephemeris and/or common TA related information, the occurrence of uplink out-of-synchronization caused by expiration of validity timer due to the terminal device being not capable of reading system information on an activated BWP can be avoided to a certain extent.

Figure 5:
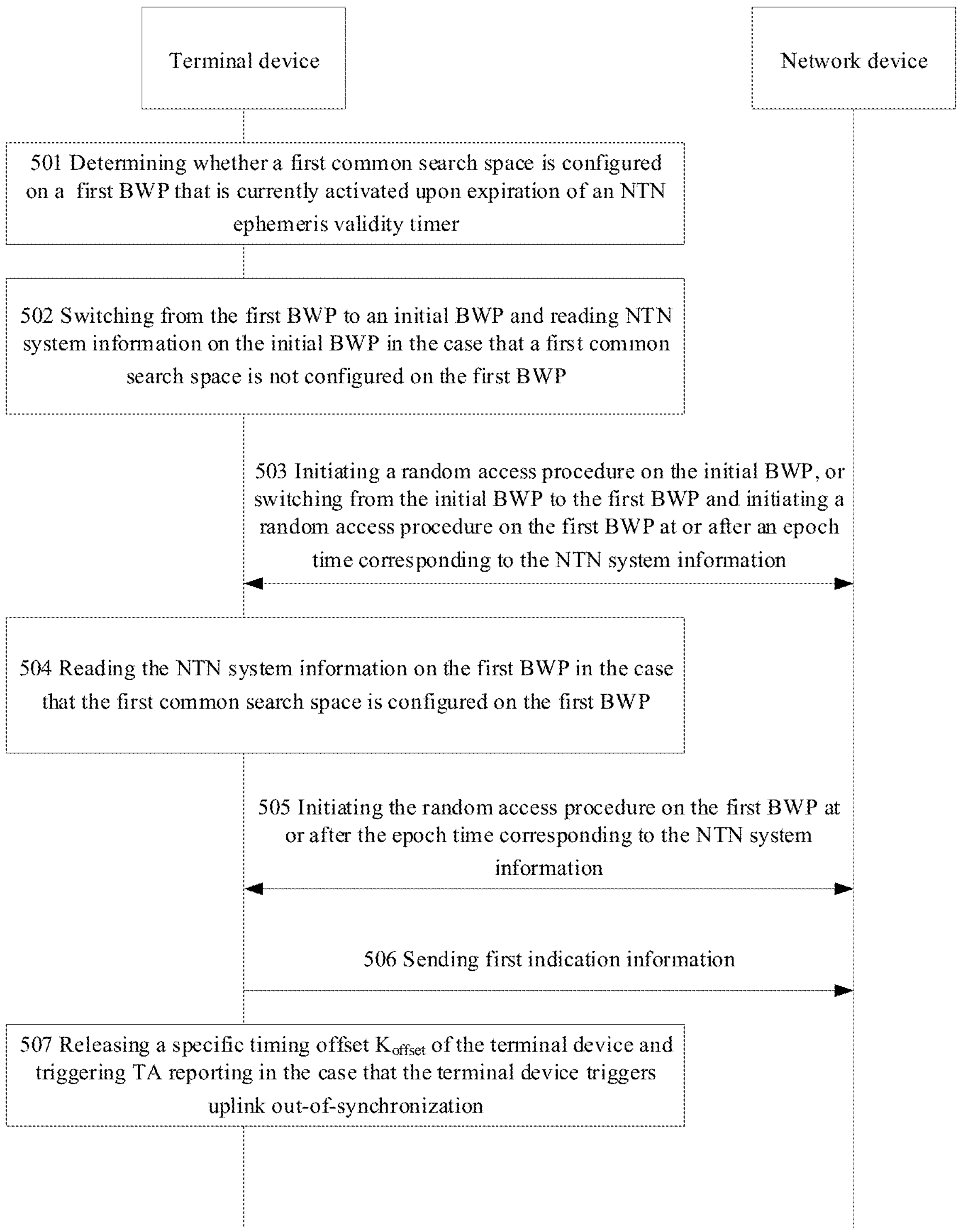
FIG. 5 is a schematic diagram of a method for resuming uplink synchronization according to some embodiments of the present disclosure.

As shown in FIG. 5, a schematic diagram of a method for resuming uplink synchronization according to some embodiments of the present disclosure is given. The method includes the following processes.

In process 501, whether a first common search space is configured on a first BWP that is currently activated in the case that an NTN ephemeris validity timer expires is determined.

In the process, the first common search space includes a search space for system information block 1 (searchSpaceSIB1) and a search space for other system information (searchSpaceOtherSystemInformation). The searchSpaceSIB1 indicates a PDCCH search space scheduled by SIB1, and the searchSpaceOtherSystemInformation indicates a PDCCH search space scheduled by SI.

Processes 502 and 503 are performed in the case that a first common search space is not configured, and processes 504 and 505 are performed in the case that the first common search space is configured. For a UE in an RRC connected state, the UE acquires ephemeris information of a serving satellite and related parameters such as a common TA by reading a broadcast or receiving an RRC reconfiguration message.

In process 502, prior to expiration of an NTN ephemeris validity timer, in the case that a first common search space is not configured on a first BWP that is currently activated, a terminal device switches from the first BWP to an initial BWP, and reads NTN system information on the initial BWP, wherein the NTN system information includes ephemeris information of a serving satellite and/or a TA, the terminal device is in a connected state, and the first common search space includes at least one of a search space for system information block 1 or a search space for other system information.

In some embodiments, the terminal device switches from the first BWP to the initial BWP includes under any one of the following trigger conditions:

(1) The NTN ephemeris validity timer expires; for example, in the case that the NTN ephemeris validity timer expires, the UE triggers to switch from the first BWP to the initial BWP.

(2) The terminal device receives a PDCCH in the case that the NTN ephemeris validity timer expires, wherein the PDCCH instructs the terminal device to initiate a random access procedure; for example, in the case that the NTN ephemeris validity timer expires, the UE, when receiving a PDCCH order, triggers to switch from the first BWP to the initial BWP.

(3) Uplink data arrives at the terminal device in the case that the NTN ephemeris validity timer expires. For example, in the case that the NTN ephemeris validity timer expires, the UE triggers to switch from the first BWP to the initial BWP in the case that uplink data arrives at the UE or for other reasons.

(4) The terminal device initiates the random access procedure in the case that the NTN ephemeris validity timer expires.

For example, for a UE in an RRC connected state, in the case that the NTN ephemeris validity timer expires and the UE does not configure searchSpaceSIB1 or searchSpaceOtherSystemInformation on a first BWP that is currently activated, the UE switches from the currently activated first BWP to an initial BWP, and the UE re-reads NTN-SIBx on the initial BWP, wherein the NTN-SIBx includes ephemeris information of the serving satellite and/or related parameters such as a common TA.

In some embodiments, the method further includes: in the case that the terminal device switches from the first BWP to the initial BWP and a BWP-inactivity timer corresponding to the first BWP is running, the terminal device stops or pauses the inactivity timer. For example, in response to the UE switching from the currently activated first BWP to the initial BWP, UE stops or pauses the BWP-inactivity timer corresponding to the first BWP in the case that the BWP-inactivity timer is running. For example, as shown in FIG. 6, a schematic diagram illustrating that an NTN ephemeris validity timer expires and NTN system information is reacquired according to some embodiments of the present disclosure is given.

In process 503, upon reading the NTN system information on the initial BWP, and at or after an epoch time corresponding to the NTN system information, the terminal device initiates a random access procedure on the initial BWP, or the terminal device switches from the initial BWP to a first BWP and initiates a random access procedure on the first BWP.

In some embodiments, the random access procedure is initiated under at least one of the following trigger conditions:

(1) The terminal device receives a PDCCH, and at or after an epoch time corresponding to the NTN system information, wherein the PDCCH instructs the terminal device to initiate random access. For example, upon reacquiring the NTN-SIBx, in the case that the UE receives a PDCCH order, the UE initiates the random access procedure at or after an epoch time corresponding to the NTN system information.

(2) Uplink data arrives at the terminal device, and at or after an epoch time corresponding to the NTN system information. For example, upon reacquiring the NTN-SIBx, in the case that the uplink data arrives at the UE, or a random access procedure is triggered due to other reasons, the UE initiates the random access procedure at or after an epoch time corresponding to the NTN system information.

(3) Upon reading the NTN system information on the initial BWP, the terminal device initiates a random access procedure at or after an epoch time corresponding to the NTN system information.

In some embodiments, the process that upon reading the NTN system information on the initial BWP, the terminal device initiates the random access procedure on the initial BWP, or the terminal device switches from the initial BWP to the first BWP and initiates the random access procedure includes:

(1) Upon reading the NTN system information on the initial BWP, the terminal device initiates the random access procedure on the initial BWP. That is, upon reacquiring the NTN-SIBx on the initial BWP, the UE initiates the random access procedure on the initial BWP.

(2) In the case that a RACH resource is present on the first BWP, the terminal device switches from the initial BWP to the first BWP, and initiates the random access procedure on the first BWP. That is, upon reacquiring the NTN-SIBx on the initial BWP, in the case that a RACH resource is present on the first BWP, the UE switches from the initial BWP to the first BWP and initiates the random access procedure on the first BWP.

(3) In the case that the RACH resource is not present on the first BWP, the UE initiates the random access procedure on the initial BWP. That is, upon reacquiring the NTN-SIBx on the initial BWP, in the case that no RACH resource is present on the first BWP, the UE initiates the random access procedure on the initial BWP.

In some embodiments, the method further includes: starting or resuming the inactivity timer corresponding to the first BWP in the case that the terminal device switches from the initial BWP to the first BWP.

For example, the UE re-switches to the first BWP upon re-reading NTN-SIBx on the initial BWP. Meanwhile, in the case that the UE previously triggers to switch from the first BWP to the initial BWP, the BWP-inactivity timer corresponding to the first BWP is running, and then the UE starts or resumes the BWP-inactivity timer corresponding to the first BWP in the case that the UE re-switches from the initial BWP to the first BWP.

In process 504, in the case that an NTN ephemeris validity timer expires and a first common search space is configured on a first BWP that is currently activated, the terminal device reads the NTN system information on the first BWP.

In the process, the NTN system information includes a search space for system information block 1 (searchSpaceSIB1) and a search space for other system information (searchSpaceOtherSystemInformation).

For example, for a UE in an RRC connected state, in the case that an NTN ephemeris validity timer expires and the UE configures searchSpaceSIB1 and searchSpaceOtherSystemInformation on an activated first BWP, the UE reads NTN-SIBx on the activated first BWP, wherein the NTN-SIBx includes ephemeris information of a serving satellite and/or related parameters such as a common TA.

In some embodiments, upon reading the NTN system information, the terminal device starts or restarts the NTN ephemeris validity timer at an epoch time corresponding to the NTN system information.

For example, in the case that the NTN ephemeris validity timer expires and the UE re-reads the NTN-SIBx, the UE starts or restarts the NTN ephemeris validity timer at an epoch time corresponding to the ephemeris information of the serving satellite and the common TA information that are configured by the NTN-SIBx. How the UE re-reads the NTN-SIBx (e.g., at which time the UE re-reads the NTN-SIBx specifically) depends on the UE implementation.

In process 505, upon re-reading the NTN system information, the terminal device initiates a random access procedure on the first BWP at or after an epoch time corresponding to the NTN system information.

In some embodiments, the random access procedure is initiated under at least one of the following trigger conditions:

The terminal device receives a PDCCH, wherein the PDCCH instructs the terminal device to initiate the random access procedure; and uplink data arrives at the terminal device.

It should be noted that process 501 and processes 503 to 505 are optional.

In process 506, the terminal device transmits first indication information to a network device, wherein the first indication information indicates state information of the NTN ephemeris validity timer.

In process 507, in the case that the terminal device triggers uplink out-of-synchronization, the terminal device releases the specific timing offset $K_{offset}$ of the terminal device and triggers TA reporting.

For details about processes 506 and 507, reference is made to processes 305 and 306 in the embodiment shown in FIG. 3, which are not described herein any further.

In the embodiments of the present disclosure, in the case that the NTN ephemeris validity timer expires and a first common search space is not configured on a first BWP that is currently activated, a terminal device switches from the first BWP to an initial BWP, and reads NTN system information on the initial BWP. The NTN system information includes ephemeris information of a serving satellite and/or a common TA, the terminal device is in a connected state, and the first common search space includes at least one of a search space for system information block 1 and a search space for other system information. In the case that the NTN ephemeris validity timer expires and a first common search space is configured on a first BWP that is currently activated, the terminal device reads the NTN system information on the first BWP. Namely, a mode for the terminal device to re-read the NTN-SIBx to acquire the serving satellite ephemeris and/or common TA related information and resume uplink synchronization in the case that the validity timer expires is provided.

As shown in FIG. 7, a schematic diagram of a method for resuming uplink synchronization according to some embodiments of the present disclosure is given. The method includes the following processes.

In process 701, the terminal device reports second indication information to a network device, wherein the second indication information indicates whether the terminal device has the first terminal device capability.

That is, the UE reports the first UE capability to the network device (e.g., a base station). In the case that the terminal device has the first terminal device capability, the second indication information indicates that the terminal device has the first terminal device capability. In the case that the terminal device does not have the first terminal device capability, the second indication information indicates that the terminal device does not have the first terminal device capability.

In some embodiments, the terminal device is a narrowband internet of things terminal device and/or an enhanced machine-type communication terminal device.

In some embodiments, the first terminal device capability is an optional capability supported by the terminal device.

In some embodiments, the first terminal device capability is an essential capability supported by the terminal device, and the terminal device supports the NTN.

It should be noted that process 701 is optional.

In process 702, in the case that an NTN ephemeris validity timer expires and a terminal device has a first terminal device capability, the terminal device reacquires NTN system information, wherein the first terminal device capability indicates a capability of the terminal device for reading the NTN system information in a connected state, the NTN system information includes ephemeris information of a serving satellite and/or a common TA, and the terminal device is in the connected state.

1) In some embodiments, in the case that the first terminal device capability is an optional capability supported by the terminal device, the method further includes:

(1) In the case that an NTN ephemeris validity timer expires and a terminal device has a first terminal device capability, the terminal device reacquires the NTN system information and initiates the random access procedure at or after an epoch time corresponding to the NTN system information.

In some embodiments, the random access procedure is initiated under at least one of the following trigger conditions: the terminal device receives a PDCCH, wherein the PDCCH instructs the terminal device to initiate the random access procedure; or uplink data arrives at the terminal device.

(2) In the case that the NTN ephemeris validity timer expires and the terminal device does not have the first terminal device capability, the terminal device triggers a radio link failure (RLF). Further, in some embodiments, the terminal device reacquires the NTN system information and initiates an RRC reestablishment procedure.

For example, a first UE capability is introduced for an NB-IoT and/or eMTC terminal, wherein the first UE capability indicates whether the UE is capable of reading NTN system information in an RRC connected state. The first UE capability is an optional UE capability for a UE supporting the NTN. In the case that the NTN ephemeris validity timer expires and the UE has the first UE capability, the UE reacquires the NTN-SIBx, and then initiates the random access procedure at or after an epoch time corresponding to the NTN system information; and in the case that the UE does not have the first UE capability, the UE triggers an RLF.

For the UE in the connected state, in the case that the NTN ephemeris validity timer expires, the process that the UE determines, based on whether the UE has the first UE capability, which manner to use to resume uplink synchronization includes:

in the case that the UE has the first UE capability, the UE reacquires the NTN-SIBx, and then initiates random access procedure at or after an epoch time corresponding to the NTN system information; and in the case that the UE does not have the first UE capability, the UE triggers an RLF, reacquires the NTN-SIBx, and then initiates an RRC reestablishment procedure.

2) In some embodiments, in the case that the first terminal device capability is an essential capability supported by the terminal device, the method further includes: in the case that an NTN ephemeris validity timer expires and a terminal device has a first terminal device capability, the terminal device reacquires the NTN system information and initiates the random access procedure at or after an epoch time corresponding to the NTN system information.

In some embodiments, the random access procedure is initiated under at least one of the following trigger conditions: the terminal device receives a PDCCH, wherein the PDCCH instructs the terminal device to initiate the random access procedure; or uplink data arrives at the terminal device.

For example, a first UE capability is introduced for an NB-IoT and/or eMTC terminal, wherein the first UE capability indicates whether the UE is capable of reading system information in an RRC connected state, and the first UE capability is an essential UE capability for a UE supporting the NTN. In the case that the NTN ephemeris validity timer expires, the UE reacquires the NTN-SIBx, and then initiates the random access procedure at or after an epoch time corresponding to the NTN system information to resume uplink synchronization.

In the embodiments of the present disclosure, a first terminal device capability is introduced for an NB-IoT and/or eMTC terminal, wherein the first terminal device capability indicates whether the terminal device is capable of reading NTN system information in an RRC connected state. For a terminal device supporting the NTN, the first terminal device capability is an optional terminal device capability; in the case that the NTN ephemeris validity timer expires and the terminal device has the first terminal device capability, the terminal device reacquires the NTN-SIBx, and then initiates the random access procedure at or after an epoch time corresponding to the NTN system information; and in the case that the terminal device does not have the first terminal device capability, the terminal device triggers an RLF. For a terminal device supporting the NTN, the first terminal device capability is an essential terminal device capability; and in the case that the NTN ephemeris validity timer expires, the terminal device reacquires the NTN-SIBx, and then initiates the random access procedure at or after an epoch time corresponding to the NTN system information. Namely, an uplink synchronization resumption mechanism is introduced for scenarios that NB-IoT and eMTC UEs access NTN.

As shown in FIG. 8, a schematic diagram of a terminal device according to some embodiments of the present disclosure is given. The terminal device includes: a processing module 801 and a transceiver module 802.

The processing module 801 is configured to, prior to expiration of an NTN ephemeris validity timer or upon expiration of the NTN ephemeris validity timer, switch from a first BWP that is currently activated to an initial BWP and read NTN system information on the initial BWP in the case that a first common search space is not configured on the first BWP, wherein the NTN system information comprises ephemeris information of a serving satellite and/or a common TA, wherein the terminal device is in a connected state, and the first common search space comprises at least one of a search space for system information block 1 or a search space for other system information.

In some embodiments, in the case that the NTN ephemeris validity timer expires and a first common search space is not configured on the currently activated first BWP, the terminal device switches from the first BWP to the initial BWP under at least one of the following trigger conditions:

- the NTN ephemeris validity timer expires;
- the terminal device receives a PDCCH in the case that the NTN ephemeris validity timer expires, wherein the PDCCH instructs the terminal device to initiate the random access procedure;
- uplink data arrives at the terminal device in the case that the NTN ephemeris validity timer expires; and
- the terminal device initiates the random access procedure in the case that the NTN ephemeris validity timer expires.

In some embodiments, the processing module 801 is further configured to: initiate a random access procedure on the initial BWP upon reading the NTN system information on the initial BWP and at or after an epoch time corresponding to the NTN system information; or switch from the initial BWP to the first BWP, and initiate a random access procedure on the first BWP upon reading the NTN system information on the initial BWP and at or after an epoch time corresponding to the NTN system information.

In some embodiments, the random access procedure is initiated under at least one of the following trigger conditions: the terminal device receives a PDCCH, wherein the PDCCH instructs the terminal device to initiate the random access procedure; and uplink data arrives at the terminal device.

In some embodiments, the processing module 801 is further configured to switch from the initial BWP to the first BWP, and initiate the random access procedure on the first BWP in the case that a RACH resource is present on the first BWP; or initiate the random access procedure on the initial BWP in the case that no RACH resource is present on the first BWP.

In some embodiments, the processing module 801 is further configured to stop or pause, in the case that an inactivity timer corresponding to the first BWP is running, the inactivity timer in response to the terminal device switching from the first BWP to the initial BWP.

In some embodiments, the processing module 801 is further configured to start or resume the BWP-inactivity timer corresponding to the first BWP in response to the terminal device switching from the initial BWP to the first BWP.

In some embodiments, the processing module 801 is further configured to, prior to expiration of the NTN ephemeris validity timer or upon expiration of the NTN ephemeris validity timer, read the NTN system information on the first BWP in the case that the first common search space is configured on the currently activated first BWP.

In some embodiments, the transceiver module 802 is configured to transmit first indication information to a network device, wherein the first indication information indicates state information of the NTN ephemeris validity timer.

In some embodiments, the transceiver module 802 is configured to report a capability of transmitting the first indication information to the network device based on a capability.

In some embodiments, the transceiver module 802 is further configured to transmit the first indication information to the network device in the case that any one of the following conditions is satisfied:

- the network device configures the terminal device with permission to report the first indication information;
- a first common search space is not configured on the first BWP;
- the first common search space is configured on the first BWP;
- the terminal device switches from the first BWP to a second BWP, the first common search space is configured on the first BWP, and a first common search space is not configured on the second BWP;
- the terminal device receives a request of the network device;
- the network device configures the terminal device with permission to report the first indication information, and a first common search space is not configured on the first BWP;
- the network device configures the terminal device with permission to report the first indication information, and the first common search space is configured on the first BWP;
- the network device configures the terminal device with permission to report the first indication information, and the terminal device switches from the first BWP to the second BWP; or
- the network device configures the terminal device with permission to report the first indication information, and the terminal device receives a request from the network device.

In some embodiments, the state information of the NTN ephemeris validity timer includes at least one of:

- time when the terminal device last starts the NTN ephemeris validity timer;
- time when the NTN ephemeris validity timer expires; or
- a running state of the NTN ephemeris validity timer at a first reference time for the terminal device, the first reference time being not earlier than time when the terminal device last starts the NTN ephemeris validity timer.

In some embodiments, a reference point of the time is at least one of a UL/DL SFN at the terminal device or a first reference point, a UL/DL subframe number at the terminal device or a first reference point, or a UTC, wherein the first reference point is a reference point where DL timing and UL timing corresponding to a current serving cell are aligned.

In some embodiments, the first indication information is carried by RRC signaling or MAC CE signaling.

In some embodiments, the processing module 801 is further configured to release a specific timing offset $K_{offset}$ of the terminal device in the case that the terminal device triggers uplink out-of-synchronization.

In some embodiments, a condition for triggering the uplink out-of-synchronization includes at least one of: a TA timer expires; the NTN ephemeris validity timer expires; and a GNSS validity timer expires, wherein the GNSS validity timer is applicable to an internet of things terminal device.

In some embodiments, the processing module 801 is further configured to release the specific timing offset $K_{offset}$ by the terminal device in the case that uplink out-of-synchronization for the terminal device occurs; or the processing module 801 is further configured to release a specific timing offset $K_{offset}$ by the terminal device in the case that uplink out-of-synchronization for the terminal device occurs and the terminal device initiates the random access procedure.

In some embodiments, the processing module 801 is further configured to trigger TA reporting.

In some embodiments, the processing module 801 is further configured to trigger TA reporting by the terminal device in the case that the network device configures TA reporting; or the processing module 801 is further configured to trigger, in the case that the system information instructs the terminal device to report a TA in a random access procedure, TA reporting in response to the terminal device initiating the random access procedure.

Figure 9:
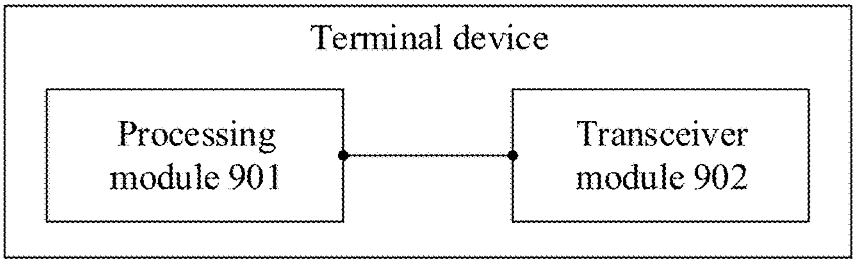
FIG. 9 is a schematic diagram of a terminal device according to some embodiments of the present disclosure.

As shown in FIG. 9, a schematic diagram of a terminal device according to some embodiments of the present disclosure is given. The terminal device includes: a processing module 901 and a transceiver module 902.

The processing module 901 is configured to reacquire NTN system information in the case that an NTN ephemeris validity timer expires and the terminal device has a first terminal device capability, wherein the first terminal device capability indicates a capability of the terminal device for reading the NTN system information in a connected state, the NTN system information comprises ephemeris information of a serving satellite and/or a common TA, and the terminal device is in the connected state.

In some embodiments, the transceiver module 902 is configured to report second indication information to a network device, wherein the second indication information indicates whether the terminal device has the first terminal device capability.

In some embodiments, the first terminal device capability is an optional capability supported by the terminal device.

In some embodiments, the first terminal device capability is an essential capability supported by the terminal device, and the terminal device supports the NTN.

In some embodiments, the transceiver module 902 is further configured to initiate the random access procedure in the case that the NTN system information is reacquired and at or after an epoch time corresponding to the NTN system information.

In some embodiments, the random access procedure is initiated under at least one of the following trigger conditions: the terminal device receives a PDCCH, wherein the PDCCH instructs the terminal device to initiate the random access procedure; and uplink data arrives at the terminal device.

In some embodiments, the processing module 901 is further configured to trigger an RLF in the case that the NTN ephemeris validity timer expires and the terminal device does not have the first terminal device capability.

In some embodiments, the transceiver module 902 is further configured to reacquire the NTN system information and initiate an RRC reestablishment procedure.

In some embodiments, the terminal device is a narrowband IoT terminal device and/or an enhanced machine-type communication terminal device.

Figure 10:
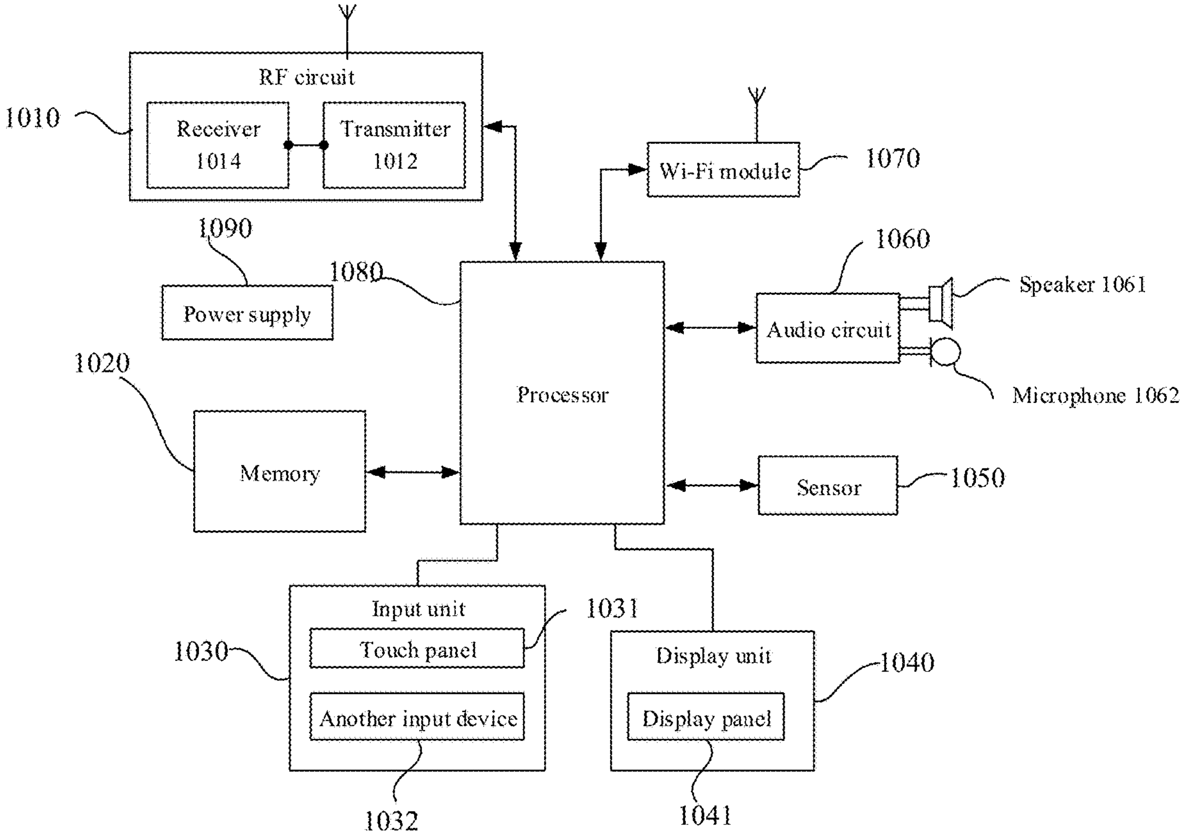
FIG. 10 is a schematic diagram of a terminal device according to some embodiments of the present disclosure.

As shown in FIG. 10, a schematic diagram of a terminal device according to some embodiments of the present disclosure is given. By taking a mobile phone as an example, the terminal device includes: a radio frequency (RF) circuit 1010, a memory 1020, an input unit 1030, a display unit 1040, a sensor 1050, an audio circuit 1060, a Wi-Fi module 1070, a processor 1080, a power supply 1090, and other components. The radio frequency circuit 1010 includes a receiver 1014 and a transmitter 1012. Those skilled in the art understand that the structure of the mobile phone illustrated in FIG. 10 does not constitute any limitation on the mobile phone, and that more or fewer components than those illustrated are included, or some of the components are combined, or a different arrangement of components is employed.

The various components of the mobile phone are described in detail hereinafter with reference to FIG. 10.

The RF circuit 1010 is configured to receive and transmit signals during an information transmission or a call, and in particular, to receive downlink information from a base station and transmit the received downlink information to the processor 1080 for processing. In addition, the RF circuit 1010 is configured to transmit design uplink data to the base station. Generally, the RF circuit 1010 includes, but is not limited to, an antenna, at least one amplifier, a transceiver, a coupler, a low noise amplifier (LNA), a duplexer, and the like. In addition, the RF circuit 1010 communicates with networks and other devices via wireless communication. The wireless communication adopts any communication standard or protocol, including but not limited to the GSM, GPRS, CDMA, WCDMA, LTE, email, short messaging service (SMS), and the like.

The memory 1020 is configured to store software programs and modules. The processor 1080 runs various functional applications of the mobile phone and perform data processing by running software programs and modules stored in the memory 1020. The memory 1020 mainly includes a program storage area and a data storage area. The program storage area stores an operating system, an application program required for at least one function (such as a sound playing function and an image playing function, and the like). The data storage area stores data (such as audio data, a phonebook, and the like) created based on the use of the mobile phone. Furthermore, the memory 1020 includes a high-speed random-access memory, and further includes a non-volatile memory, such as at least one magnetic disk memory device, a flash memory device, or other volatile solid-state memory device.

The input unit 1030 is configured to receive input figure or character information and generate key signal input associated with user settings and function control of the mobile phone. Specifically, the input unit 1030 includes a touch panel 1031 and another input device 1032. The touch panel 1031, also referred to as a touch screen, collects a touch operation of a user thereon or in the vicinity thereof (e.g., an operation of a user on the touch panel 1031 or in the vicinity of the touch panel 1031 using any suitable object or accessory such as a finger or a stylus) and drives a corresponding connection apparatus based on a preset program. In some embodiments, the touch panel 1031 includes two parts, i.e., a touch detection apparatus and a touch controller. The touch detection apparatus detects the touch orientation of a user, detects a signal brought by a touch operation, and transmits the signal to the touch controller. The touch controller receives touch information from the touch detection apparatus, converts the touch information into touch point coordinates, and transmits the touch point coordinates to the processor 1080, and is able to receive and execute a command from the processor 1080. In addition, the touch panel 1031 is implemented by various types such as resistive and capacitive touch, infrared touch, and surface acoustic wave touch. The input unit 1030 further includes another input device 1032 in addition to the touch panel 1031. In particular, the another input device 1032 includes, but is not limited to, one or more of a physical keyboard or keypad, a function key or button (e.g., a volume control key or button, or a switch key or button), a trackball, a mouse, a joystick, or the like.

The display unit 1040 is configured to display information input by a user or information provided for the user and various menus of the mobile phone. The display unit 1040 includes a display panel 1041. In some embodiments, the display panel 1041 is configured in the form of a liquid crystal display (LCD), an organic light-emitting diode (OLED), or the like. Further, the touch panel 1031 covers the display panel 1041. In the case of detecting a touch operation thereon or in the vicinity thereof, the touch panel 1031 transmits the touch operation to the processor 1080 to determine the type of a touch event, and then the processor 1080 provides a corresponding visual output on the display panel 1041 according to the type of the touch event. Although in FIG. 10, the touch panel 1031 and the display panel 1041 are two separate components to implement the input and output functions of the mobile phone, in some embodiments, the touch panel 1031 and the display panel 1041 are integrated to implement the input and output functions of the mobile phone.

The mobile phone further includes at least one sensor 1050, such as a light sensor, a motion sensor, and other sensors. Specifically, the light sensor includes an ambient light sensor and a proximity sensor. The ambient light sensor adjusts the brightness of the display panel 1041 according to the brightness of ambient light, and the proximity sensor turns off the display panel 1041 and/or provides backlight in the case that the mobile phone moves to the car. As one of motion sensors, an accelerometer sensor detects the magnitude of acceleration in each direction (generally three axes), detects the magnitude and direction of gravity when stationary, and is configured to recognize applications of gestures of a mobile phone (such as horizontal and vertical screen switching, related games, and magnetometer gesture calibration), vibration recognition related functions (such as pedometers and tapping), and the like. A gyroscope, a barometer, a hygrometer, a thermometer, and an infrared sensor, and other sensors that may be configured in the mobile phone are not described herein any further.

The audio circuit 1060, a speaker 1061, and a microphone 1062 provide audio interfaces between a user and a mobile phone. The audio circuit 1060 transmits an electrical signal converted from the received audio data to the speaker 1061, and the speaker 1061 converts the electrical signal into a sound signal for output. In addition, the microphone 1062 converts the collected sound signal into an electrical signal, the audio circuit 1060 receives the electrical signal and converts the electrical signal into audio data, and outputs the audio data to the processor 1080 for processing. The processed audio data is transmitted to another mobile phone via the RF circuit 1010, or the processed audio data is output to the memory 1020 for further processing.

Wi-Fi is a short-distance wireless transmission technology. A mobile phone helps a user to receive and send emails, browse webpages and access streaming media, and the like by the Wi-Fi module 1070, which provides the user with wireless broadband internet access. Although FIG. 10 shows the Wi-Fi module 1070, it is understood that the Wi-Fi module 1070 is not the essential constitution of the mobile phone, and the description of the Wi-Fi module may be omitted as needed within the scope of not changing the essence of the present disclosure.

The processor 1080 is a control center of the mobile phone, connects various parts of the mobile phone by using various interfaces and circuits, and executes various functions of the mobile phone and processes data by running or executing software programs and/or modules stored in the memory 1020 and calling data stored in the memory 1020, such that the mobile phone is monitored as a whole. In some embodiments, the processor 1080 includes one or more processing units. In some embodiments, the processor 1080 integrates an application processor and a modem processor. The application processor primarily handles an operating system, a user interface, an application program, or the like. The modem processor primarily handles wireless communications. It will be understood that the modem processor described above may not be integrated into the processor 1080.

The mobile phone further includes a power supply 1090 (e.g., a battery) for powering the various components. In some embodiments, the power supply is logically connected to the processor 1080 via a power management system, to achieve functions of managing charging and discharging and power consumption management and the like through the power management system. Although not shown, the mobile phone further includes a camera, a Bluetooth module, and the like, which are not described herein any further.

In some embodiments, the processor 1080 is configured to, prior to expiration of an NTN ephemeris validity timer or upon expiration of the NTN ephemeris validity timer, switch from a first BWP that is currently activated to an initial BWP and read NTN system information on the initial BWP in the case that a first common search space is not configured on the first BWP, wherein the NTN system information includes ephemeris information of a serving satellite and/or a common TA, wherein the terminal device is in a connected state, and the first common search space comprises at least one of a search space for system information block 1 or a search space for other system information.

In some embodiments, the terminal device switches from the first BWP to the initial BWP in the case that the NTN ephemeris validity timer expires and the first common search space is not configured on the first BWP under any one of the following trigger conditions: the NTN ephemeris validity timer expires;

the terminal device receives a PDCCH in the case that the NTN ephemeris validity timer expires, wherein the PDCCH instructs the terminal device to initiate a random access procedure;

uplink data arrives at the terminal device in the case that the NTN ephemeris validity timer expires; or the terminal device initiates the random access procedure in the case that the NTN ephemeris validity timer expires.

In some embodiments, the processor 1080 is further configured to: initiate a random access procedure on the initial BWP upon reading the NTN system information on the initial BWP and at or after an epoch time corresponding to the NTN system information; or switch from the initial BWP to the first BWP, and initiate a random access procedure on the first BWP upon reading the NTN system information on the initial BWP and at or after an epoch time corresponding to the NTN system information.

In some embodiments, the random access procedure is initiated under at least one of the following trigger conditions: the terminal device receives a PDCCH, wherein the PDCCH instructs the terminal device to initiate the random access procedure; or uplink data arrives at the terminal device.

In some embodiments, the processor 1080 is further configured to: switch from the initial BWP to the first BWP, and initiate the random access procedure on the first BWP in the case that a random access channel (RACH) resource is present on the first BWP; or initiate the random access procedure on the initial BWP in the case that no RACH resource is present on the first BWP.

In some embodiments, the processor 1080 is further configured to stop or pause, in the case that an inactivity timer corresponding to the first BWP is running, the inactivity timer in response to the terminal device switching from the first BWP to the initial BWP.

In some embodiments, the processor 1080 is further configured to start or resume the inactivity timer corresponding to the first BWP in response to the terminal device switching from the initial BWP to the first BWP.

In some embodiments, the processor 1080 is further configured to read the NTN system information on the first BWP prior to expiration of the NTN ephemeris validity timer or in the case that the NTN ephemeris validity timer expires, and the first common search space is configured on the currently activated first BWP.

In some embodiments, the RF circuit 1010 is configured to transmit first indication information to a network device, wherein the first indication information indicates state information of the NTN ephemeris validity timer.

In some embodiments, the RF circuit 1010 is configured to report a capability of transmitting the first indication information to the network device based on a capability.

In some embodiments, the RF circuit 1010 is further configured to transmit the first indication information to the network device in the case that any one of the following conditions is satisfied:

the network device configures the terminal device with permission to report the first indication information;

a first common search space is not configured on the first BWP;

the first common search space is configured on the first BWP;

the terminal device switches from the first BWP to a second BWP, the first common search space is configured on the first BWP, and a first common search space is not configured on the second BWP;

the terminal device receives a request from the network device;

the network device configures the terminal device with permission to report the first indication information, and a first common search space is not configured on the first BWP;

the network device configures the terminal device with permission to report the first indication information, and the first common search space is configured on the first BWP;

the network device configures the terminal device with permission to report the first indication information, and the terminal device switches from the first BWP to the second BWP; or the network device configures the terminal device with permission to report the first indication information, and the terminal device receives a request from the network device.

In some embodiments, the state information of the NTN ephemeris validity timer includes at least one of:

time when the terminal device last starts the NTN ephemeris validity timer;

time when the NTN ephemeris validity timer expires; and a running state of the NTN ephemeris validity timer at a first reference time for the terminal device, the first reference time being not earlier than time when the terminal device last starts the NTN ephemeris validity timer.

In some embodiments, a reference point of the time is at least one of a UL/DL SFN at the terminal device or a first reference point, a UL/DL subframe number at the terminal device or a first reference point, or a UTC, wherein the first reference point is a reference point where DL timing and UL timing corresponding to a current serving cell are aligned.

In some embodiments, the first indication information is carried by RRC signaling or MAC CE signaling.

In some embodiments, the processor 1080 is further configured to release a specific timing offset $K_{offset}$ of the terminal device in the case that the terminal device triggers uplink out-of-synchronization.

In some embodiments, the uplink out-of-synchronization is triggered under at least one of the following trigger conditions:

a timeAlignmentTimer expires;

the NTN ephemeris validity timer expires; and a global navigation satellite system (GNSS) validity timer expires, wherein the GNSS validity timer is applicable to an internet of things terminal device.

In some embodiments, the processor 1080 is further configured to release the specific timing offset $K_{offset}$ by the terminal device in the case that uplink out-of-synchronization for the terminal device occurs; or the processor 1080 is further configured to release a specific timing offset $K_{offset}$ by the terminal device in the case that uplink out-of-synchronization for the terminal device occurs and the terminal device initiates the random access procedure.

In some embodiments, the processor 1080 is further configured to trigger TA reporting.

In some embodiments, the processor 1080 is further configured to trigger TA reporting by the terminal device in the case that the network device configures TA reporting; or the processor 1080 is further configured to trigger, in the case that the system information instructs the terminal device to report a TA in a random access procedure, TA reporting in response to the terminal device initiating the random access procedure.

In some other embodiments, the processor 1080 is configured to reacquire NTN system information in the case that an NTN ephemeris validity timer expires and the terminal device has a first terminal device capability, wherein the first terminal device capability indicates a capability of the terminal device for reading the NTN system information in a connected state, the NTN system information comprises ephemeris information of a serving satellite and/or a common TA, and the terminal device is in the connected state.

In some embodiments, the RF circuit 1010 is configured to report second indication information to a network device, wherein the second indication information indicates whether the terminal device has the first terminal device capability.

In some embodiments, the first terminal device capability is an optional capability supported by the terminal device.

In some embodiments, the first terminal device capability is an essential capability supported by the terminal device, and the terminal device supports the NTN.

In some embodiments, the RF circuit 1010 is further configured to initiate a random access procedure upon reacquisition of the NTN system information and at or after an epoch time corresponding to the NTN system information.

In some embodiments, the random access procedure under at least one of the following trigger conditions: the terminal device receives a PDCCH, wherein the PDCCH instructs the terminal device to initiate the random access procedure; or uplink data arrives at the terminal device.

In some embodiments, the processor 1080 is further configured to trigger an RLF in the case that the NTN ephemeris validity timer expires and the terminal device does not have the first terminal device capability.

In some embodiments, the RF circuit 1010 is further configured to reacquire the NTN system information and initiate an RRC reestablishment procedure.

In some embodiments, the terminal device is a narrowband internet of things terminal device and/or an enhanced machine-type communication terminal device.

All or part of the above embodiments are implemented in software, hardware, firmware, or any combination thereof. In the case of implementation in software, all or part of the above embodiments are implemented in the form of a computer program product. The computer program product includes one or more computer instructions. The computer program instructions, when loaded and executed on a computer, all or part of the processes or functions according to the embodiments of the present disclosure are generated. The computer may be a general-purpose computer, a special-purpose computer, a computer network, or any other programmable apparatus. The computer instructions are stored in a computer-readable storage medium or transmitted from one computer-readable storage medium to another computer-readable storage medium. For example, the computer instructions are transmitted from one website, computer, server, or data center to another website, computer, server, or data center in a wired (such as a coaxial cable, a fiber optic, or a digital subscriber line (DSL)) or wireless (such as infrared, wireless, or microwave) mode. The computer-readable storage medium is any available medium accessible by a computer or a data storage device such as a server or a data center that includes one or more integrated available media. The available medium may be a magnetic medium (such as a floppy disk, a hard disk, or a magnetic tape), an optical medium (such as a DVD), a semiconductor medium (such as a solid-state disk (SSD)), or the like.

The terms "first," "second," "third," "fourth," and the like in the specification and claims and the above accompanying drawings of the present disclosure are defined to distinguish similar objects rather than describe a specific order or sequence. It should be understood that the data so used is interchangeable under appropriate circumstances, such that the embodiments of the present disclosure described herein are capable of implementation in other sequences than those illustrated or described herein. Moreover, the terms "comprise," "include," "have," and "provided with," and any variations thereof are intended to cover non-exclusive inclusion. For example, a process, method, system, product or device including a series of processes or units is not necessarily limited to the explicitly listed processes or units, but may include other processes or units that are not explicitly listed or are inherent in the process, method, product or device.

The invention claimed is:

1. A method for resuming uplink synchronization, comprising:

reacquiring, by a terminal device, non-terrestrial network (NTN) system information in a case that an NTN ephemeris validity timer expires and the terminal device has a first terminal device capability, wherein the first terminal device capability indicates a capability of the terminal device for reading the NTN system information in a connected state, the NTN system information comprises ephemeris information of a serving satellite and/or a common timing advance (TA), and the terminal device is in the connected state.

2. The method according to claim 1, further comprising:

reporting, by the terminal device, second indication information to a network device, wherein the second indication information indicates whether the terminal device has the first terminal device capability.

3. The method according to claim 1, wherein the first terminal device capability is an optional capability supported by the terminal device.

4. The method according to claim 1, wherein the first terminal device capability is an essential capability supported by the terminal device, and the terminal device supports the NTN.

5. The method according to claim 1, further comprising:

initiating, by the terminal device, a random access procedure upon reacquiring the NTN system information and at or after an epoch time corresponding to the NTN system information.

6. The method according to claim 5, wherein the random access procedure is initiated under at least one of the following trigger conditions:

the terminal device receives a physical downlink control channel (PDCCH), wherein the PDCCH instructs the terminal device to initiate the random access procedure; and uplink data arrives at the terminal device.

7. The method according to claim 1, further comprising:

triggering, by the terminal device, a radio link failure (RLF) in a case that the NTN ephemeris validity timer expires and the terminal device does not have the first terminal device capability.

8. The method according to claim 7, further comprising:

reacquiring, by the terminal device, the NTN system information, and initiating a radio resource control (RRC) reestablishment procedure.

9. The method according to claim 1, wherein the terminal device is a narrowband internet of things terminal device and/or an enhanced machine-type communication terminal device.

10. A non-transitory computer-readable storage medium, storing one or more instructions therein, wherein the one or more instructions, when loaded and executed by a processor, cause the processor to perform the method as defined in claim 1.

11. A terminal device, comprising:

a memory storing executable program codes; and a processor and a transceiver coupled to the memory; and wherein the processor is configured to, prior to expiration of a non-terrestrial network (NTN) ephemeris validity timer or upon expiration of the NTN ephemeris validity timer, switch from a first bandwidth part (BWP) that is currently activated to an initial BWP and read NTN system information on the initial BWP in a case that a first common search space is not configured on the first BWP, wherein the NTN system information comprises ephemeris information of a serving satellite and/or a common timing advance (TA), and wherein the terminal device is in a connected state, and the first common search space comprises at least one of a search space for system information block 1 or a search space for other system information.

12. A terminal device, comprising:

a memory storing executable program codes; and a processor and a transceiver coupled to the memory; and wherein the processor is configured to reacquire non-terrestrial network (NTN) system information in a case that an NTN ephemeris validity timer expires and the terminal device has a first terminal device capability, wherein the first terminal device capability indicates a capability of the terminal device for reading the NTN system information in a connected state, the NTN system information comprises ephemeris information of a serving satellite and/or a common timing advance (TA), and the terminal device is in the connected state.

13. The terminal device according to claim 12, wherein the transceiver is configured to report second indication information to a network device, wherein the second indication information indicates whether the terminal device has the first terminal device capability.

14. The terminal device according to claim 12, wherein the first terminal device capability is an optional capability supported by the terminal device.

15. The terminal device according to claim 12, wherein the first terminal device capability is an essential capability supported by the terminal device, and the terminal device supports the NTN.

16. The terminal device according to claim 12, wherein the transceiver is further configured to initiate a random access procedure upon reacquisition of the NTN system information and at or after an epoch time corresponding to the NTN system information.

17. The terminal device according to claim 16, wherein the random access procedure is initiated under at least one of the following trigger conditions:

the terminal device receives a physical downlink control channel (PDCCH), wherein the PDCCH instructs the terminal device to initiate the random access procedure; and uplink data arrives at the terminal device.

18. The terminal device according to claim 12, wherein the processor is further configured to trigger a radio link failure (RLF) in a case that the NTN ephemeris validity timer expires and the terminal device does not have the first terminal device capability.

19. The terminal device according to claim 18, wherein the transceiver is further configured to reacquire the NTN system information and initiate a radio resource control (RRC) reestablishment.

20. The terminal device according to claim 12, wherein the terminal device is a narrowband internet of things terminal device and/or an enhanced machine-type communication terminal device.

* * * * *